US009471853B2

(12) United States Patent
Zheng et al.

(10) Patent No.: US 9,471,853 B2
(45) Date of Patent: Oct. 18, 2016

(54) METHOD AND APPARATUS FOR IMAGE PROCESSING

(71) Applicant: Jinling Institute of Technology, Nanjing (CN)

(72) Inventors: Liming Zheng, Nanjing (CN); Bingbing Cui, Nanjing (CN)

(73) Assignee: Jinling Institute of Technology, Manjing (CN)

( * ) Notice: Subject to any disclaimer, the term of this patent is extended or adjusted under 35 U.S.C. 154(b) by 0 days.

(21) Appl. No.: 14/684,428

(22) Filed: Apr. 12, 2015

(65) Prior Publication Data

US 2015/0332127 A1    Nov. 19, 2015

(30) Foreign Application Priority Data

| May 19, 2014 | (CN) | ............... | 2014 1 0212438 |
| Jul. 14, 2014 | (CN) | ............... | 2014 1 0333183 |
| Jul. 14, 2014 | (CN) | ............... | 2014 1 0334008 |
| Jul. 14, 2014 | (CN) | ............... | 2014 1 0334974 |
| Jul. 14, 2014 | (CN) | ............... | 2014 1 0335080 |
| Feb. 9, 2015 | (CN) | ............... | 2015 1 0068199 |

(51) Int. Cl.
*G06K 9/00* (2006.01)
*G06K 9/62* (2006.01)
*G06K 9/46* (2006.01)

(52) U.S. Cl.
CPC ............... *G06K 9/6276* (2013.01); *G06K 9/00* (2013.01); *G06K 9/0055* (2013.01); *G06K 9/00523* (2013.01); *G06K 9/46* (2013.01); *G06K 9/4604* (2013.01); *G06K 9/4609* (2013.01); *G06K 9/4652* (2013.01); *G06K 9/6202* (2013.01); *G06K 9/627* (2013.01); *G06K 9/6212* (2013.01); *G06K 9/6215* (2013.01); *G06K 9/6219* (2013.01); *G06K 9/6298* (2013.01)

(58) Field of Classification Search
CPC ............ G06K 9/4652; G06K 9/6276; G06K 9/6215; G06K 9/6212; G06T 7/408; G06T 7/0081; G06T 2207/10024; G06F 17/30243
See application file for complete search history.

(56) References Cited

U.S. PATENT DOCUMENTS

| 5,130,701 A * | 7/1992 | White ...................... G09G 5/06 345/601 |
| 6,266,439 B1 * | 7/2001 | Pollard .................... H04N 1/56 382/164 |
| 7,925,083 B2 * | 4/2011 | Johnson .................. G06T 7/408 382/162 |
| 8,391,596 B2 * | 3/2013 | Forutanpour ........... G06T 7/408 382/117 |
| 8,487,959 B1 * | 7/2013 | Khan ...................... G06F 3/013 345/619 |
| 8,896,647 B2 * | 11/2014 | Goldau .................... B41M 3/14 283/84 |
| 9,105,093 B2 * | 8/2015 | Schlosser .............. G06T 7/0081 |
| 2007/0036371 A1 * | 2/2007 | Buil .................... G06F 17/3025 381/312 |
| 2008/0170778 A1 * | 7/2008 | Luo .................... G06K 9/00597 382/164 |
| 2015/0332127 A1 * | 11/2015 | Zheng .................... G06K 9/46 382/165 |

* cited by examiner

*Primary Examiner* — Amir Alavi
(74) *Attorney, Agent, or Firm* — Anna Tsang

(57) ABSTRACT

A method is provided for classifying pixels in an image into super pixels that may be executed in one or more than one electronic devices. Seed pixels are pixels selected from the image. Color distances of a color space similar to human vision perception between the seed pixels and proximal pixels are calculated. The proximal pixels are pixels located proximally to corresponding seed pixels. Geographic distances are also computed for two pixels and the geographic distances are combined with the color distances as a reference for classifying pixels into super pixels.

17 Claims, 46 Drawing Sheets

| Original picture | Sampling region | Type of region | 4D wavelet feature vector | | | |
|---|---|---|---|---|---|---|
| | | Sky | $c_{LL}$ 255.00 | $c_{LH}$ 0 | $c_{HL}$ 0 | $c_{HH}$ 0 |
| | | Roof | $c_{LL}$ 212.49 | $c_{LH}$ 11.51 | $c_{HL}$ 4.35 | $c_{HH}$ 4.02 |
| | | Wall space | $c_{LL}$ 147.18 | $c_{LH}$ 5.99 | $c_{HL}$ 2.76 | $c_{HH}$ 3.08 |
| | | Ground | $c_{LL}$ 145.23 | $c_{LH}$ 10.36 | $c_{HL}$ 8.88 | $c_{HH}$ 8.65 |
| | | Sky | $c_{LL}$ 196.21 | $c_{LH}$ 0.99 | $c_{HL}$ 1.02 | $c_{HH}$ 0.95 |
| | | Trees | $c_{LL}$ 143.82 | $c_{LH}$ 24.93 | $c_{HL}$ 21.18 | $c_{HH}$ 17.27 |
| | | Ground | $c_{LL}$ 201.47 | $c_{LH}$ 5.98 | $c_{HL}$ 2.43 | $c_{HH}$ 2.34 |
| | | Lawn | $c_{LL}$ 78.80 | $c_{LH}$ 11.40 | $c_{HL}$ 13.12 | $c_{HH}$ 10.95 |
| | | Sky | $c_{LL}$ 245 | $c_{LH}$ 2.39 | $c_{HL}$ 2.27 | $c_{HH}$ 1.71 |
| | | Roof | $c_{LL}$ 116.73 | $c_{LH}$ 18.56 | $c_{HL}$ 10.00 | $c_{HH}$ 10.18 |
| | | Wall space | $c_{LL}$ 183.95 | $c_{LH}$ 2.75 | $c_{HL}$ 1.46 | $c_{HH}$ 1.28 |
| | | Lawn | $c_{LL}$ 85.65 | $c_{LH}$ 5.46 | $c_{HL}$ 5.47 | $c_{HH}$ 4.87 |

Fig. 15

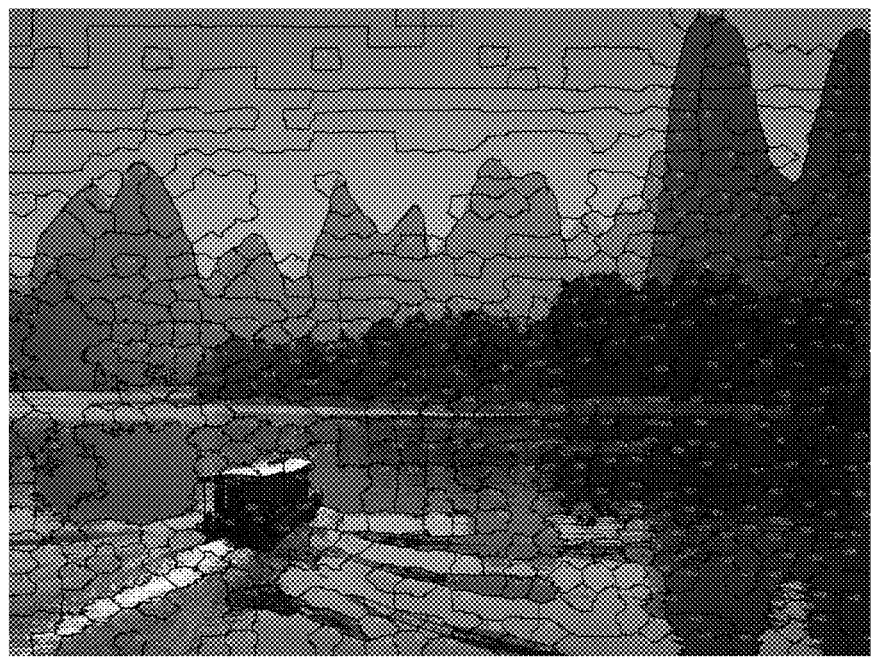
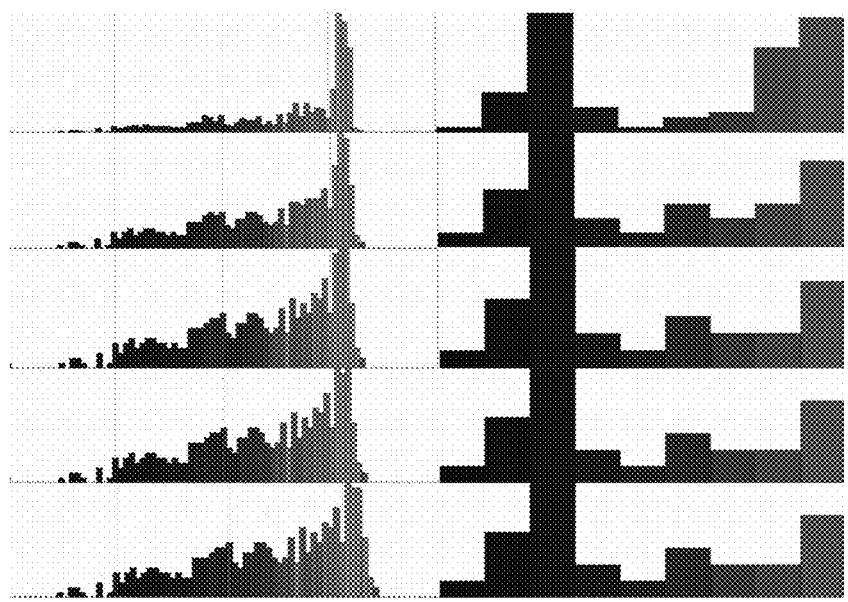
Fig. 43

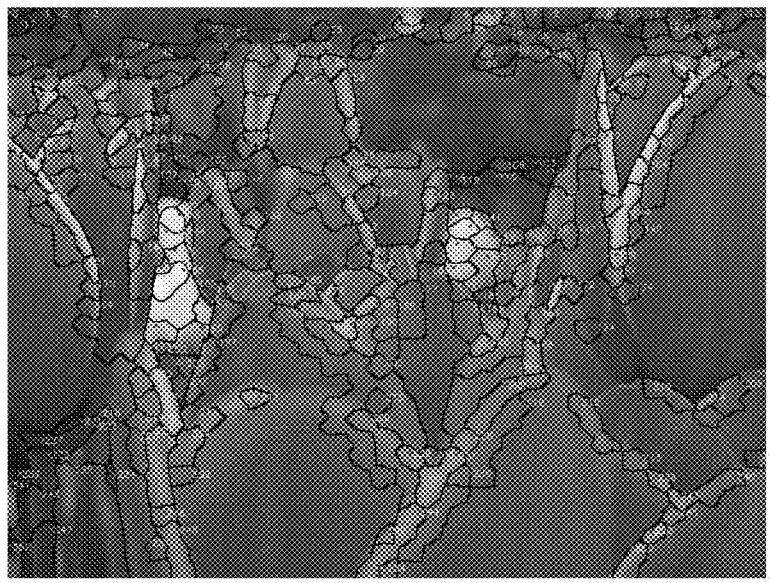
Fig. 44

METHOD AND APPARATUS FOR IMAGE PROCESSING

FIELD OF INVENTION

The present invention relates to a method and an apparatus for image processing and more particularly relates to image processing with machine intelligence.

BACKGROUND

When electronic technology is getting more and more advanced, machine learning and machine recognition are still difficult problems to be solved. Computers can calculate much faster than human being or memorize much more data than human being, but it is still difficult for computers to do what normal people can do very well, e.g. to recognize objects in an image.

But, scientists and engineers are still working day and night, trying to discover how to build machines that can do better machine vision, machine learning and even machine thinking because such topics can lead to great advancement of new technologies that will dramatically change human life.

Among these topics, machine recognition for images that are taken in earth-like environment is a very important field. With a better machine recognition for such images, various new applications may be built thereupon.

Therefore, it is beneficial to improve machine recognition and establish effective technical solutions thereof.

SUMMARY OF INVENTION

According to a first embodiment of the present invention, a method is provided for classifying pixels in an image into super pixels. The method may be executed in an electronic system, e.g. executed in an electronic apparatus or executed by multiple electronic apparatuses connected via various links or networks. The method includes following steps.

Seed pixels are pixels selected from the image. Color distances of a color space between the seed pixels and proximal pixels are calculated. The proximal pixels are pixels located proximally to corresponding seed pixels. For example, the proximal pixel may refer to pixels directly adjacent to the seed pixels and may also include pixels not directly adjacent to the seed pixels but located within a predetermined geographic distance.

There are various color spaces. A preferred color space to be chosen for the following application is a color space having a luminance component and two color opponents. For example, CIELAB color space has three components, L, A, B, where L refers to luminance value and A, B refer to color opponent values.

Specifically, a Lab color space is a color-opponent space with dimension L for luminance and a and b for the color-opponent dimensions, based on nonlinearly-compressed CIE XYZ color space coordinates. The coordinates of the Hunter 1948 L, a, b color space are L, a, and b. However, Lab is now more often used as an informal abbreviation for the CIE 1976 (L*, a*, b*) color space (also called CIELAB, whose coordinates are actually L*, a*, and b*). Thus the initials Lab by themselves are somewhat ambiguous. The color spaces are related in purpose, but differ in implementation.

The intention of CIELAB (or L*a*b* or Lab) is to produce a color space that is more perceptually linear than other color spaces. Perceptually linear means that a change of the same amount in a color value should produce a change of about the same visual importance. CIELAB has almost entirely replaced an alternative related Lab color space "Hunter Lab". This space is commonly used for surface colors, but not for mixtures of (transmitted) light CIE 1976 L*a*b* (CIELAB) is the most complete color model used conventionally to describe all the colors visible to the human eye. It was developed for this specific purpose by the International Commission on Illumination (Commission Internationale d'Eclairage). The asterisk (*) after L, a and b are part of the full name, since they represent L*, a* and b*, to distinguish them from L, a and b. Because the Red/Green and yellow/blue opponent channels are computed as differences of Munsell-value-like transformations of (putative) cone responses, CIELAB is an Adams Chromatic Value Space. The three basic coordinates represent the lightness of the color (L*, L*=0 yields black and L*=100 indicates white), its position between red/magenta and green (a*, negative values indicate green while positive values indicate magenta) and its position between yellow and blue (b*, negative values indicate blue and positive values indicate yellow). A Lab color space is a color-opponent space with dimension L for luminance and a and b for the color-opponent dimensions, based on nonlinearly-compressed CIE XYZ color space coordinates. The CIE XYZ color space is special, however, because it is based on direct measurements of human visual perception, and serves as the basis from which many other color spaces are defined. In the CIE XYZ color space, the tristimulus values are not the S, M, and L stimuli of the human eye, but rather a set of tristimulus values called X, Y, and Z, which are roughly red, green and blue, respectively, and are calculated using the CIE 1931 XYZ color matching functions.

Unlike the RGB and CMYK color models, Lab color is designed to approximate human vision. It aspires to perceptual uniformity, and its L component closely matches human perception of lightness. It can thus be used to make accurate color balance corrections by modifying output curves in the a and b components, or to adjust the lightness contrast using the L component. These transformations are difficult or impossible in the RGB or CMYK spaces, which model the output of physical devices, rather than human visual perception. Because Lab space is much larger than the gamut of computer displays, printers, or even human vision, a bitmap image represented as Lab requires more data per pixel to obtain the same precision as an RGB or CMYK bitmap.

In short, after experiments, a color space modeling human vision perception like CIELAB is particularly preferable in the following applications. Please be noted that the term CIELAB in this specification also refers to all color spaces similar with the concept as mentioned as above.

In addition, geographic distances between the seed pixels and the proximal pixels corresponding to the seed pixels are also calculated. A color distance and a geographic distance are combined to obtain a combined distance for determining whether a pixel should be grouped to a pixel group. In this example, some pixels are chosen as seed pixels. In other words, pixels around or near these seed pixels regarded as proximal pixels are used to calculate their distances with the seed pixels to determine how to group pixels into super pixels. A preferred super pixel is a pixel set that contains multiple pixels having similar combined distances among each other.

Such calculation and grouping may be performed for multiple iterations. In other words, at first, the seed pixels may be chosen evenly from the image, but later other pixels may be chosen as seed pixels after iterations of super pixel grouping calculation. Finally, pixels nearby with similar color are grouped as super pixels. Such work helps dramatically decrease computation complexity. For example, an image of 5 million pixels may be simplified to 50K super pixels if 100 pixels are grouped as a super pixel.

In addition, when color space like CIELAB is chosen for calculating the color distance, emphasizing the angle between two color opponents is very helpful on eliminating interference of light or shadow disturbance in real images. Specifically, for two pixels respectively having (L1, A1, B1) and (L2, A2, B2) vectors in CIELAB color space, the angle between two color opponents (A1, B1) and (A2, B2), instead of norm difference between (A1, B1) and (A2, B2) provides more helpful information to correctly identify pixels belonging to the same object but appear differently under light and shadow effect.

However, please be also noted that the weighing of the angles of (A, B), the norms of (A, B) and the luminance of (L) may be given different weighting to reach an optimized super pixel grouping. In some case, other factors instead of the angle would play more important roles to get optimized super pixel grouping.

Besides, when the color distance is calculated, there are three components involved, e.g. L, A, B in CIELAB color space. These components may be given different weighting under different circumstances to achieve best effect.

For example, if the image has any correlated information indicating that the image is taken in day time or in night time, different weighting may be given to the L, A, B components. Specifically, luminance may be more important in day time images, but plays less important role in night time image.

In addition to determine whether the image is taken in day time or night time, other circumstances determined by inherent or external information may also be used for increasing accuracy of super pixel grouping. For example, color temperature, cloudy scenes, night scenes with moon or with stars, scenes with street lights or other clues may be referenced to adjusting corresponding parameters for calculating color distances.

In another aspect, it is noted that when two colors have smaller norms (polar lengths), it is difficult for human eyes to distinguish these two colors. Therefore, when calculating a color distance between two colors, luminance L may be given higher weighting when the opponents A, B appear having a low purity range, e.g. the norm of the A, B is smaller than a predetermined threshold.

On the other hand, if the opponents A, B appear having larger purity, the angle between two color vectors as mentioned above is given higher weighting on calculating color distance.

Under different design requirements or different image characteristics, the color distance may also reference both norm difference and angle difference of two color vectors in a color space.

To simplify calculation for different concerns, e.g. saving power or performing real time calculation in robotic applications, the color difference may be defined by:

$$Distance_{color} = \alpha|\theta_1 - \theta_2| + \beta|m_1 + m_2| + \gamma|L_1 + L_2|$$

where $\theta_1$ and $\theta_2$ are angles of the two color opponents of the first pixel and the second pixel, m1 and m2 are norms of the first pixel and the second pixel on the sub space (A, B) of CIELAB, L1 and L2 are luminance component values of the first pixel and the second pixel and $\alpha$, $\beta$ and $\gamma$ are weights adjustable in different type of image scenes.

On the other hand, the geographic difference between a first pixel and a second pixel may be defined as:

$$Distance_{geo} = \psi|(x1-x2|-|y1-y2|)$$

where x1 and x2 are pixel positions of the first pixel and the second pixel in the first coordinate axis and y1 and y2 are pixel positions of the first pixel and the second pixel in the second coordinate axis.

The combined difference may be calculated by adding the geographic difference and the color difference. Different weighting may be adjusted when adding the color distance and the geographic distance.

In addition, because there are various cameras with different pixel resolutions, e.g. 1 Million pixels, 5 Million pixels, 12 Million pixels, normalization is particularly important when establishing the function to calculate the combined distance as mentioned above. For example, in large pixel resolution images, the geographic distance need to be normalized so as to eliminate the effect of resolution difference.

Because super pixel grouping involves lots of computation, these computation tasks may be divided into multiple threads to be performed by multiple processor cores or by multiple machines. More than one threads may be executed in parallel at the same, which will rapidly decreases computation time, e.g. from several minutes to less than one second.

Please be noted that it is particularly important in real time applications like auto-pilot systems for cars, airplanes, missile, satellite, Mars explorer machines, etc. Currently, there are inexpensive graphic accelerated cards that can be installed on general computers while having multiple processor cores. The heavy distance calculation as mentioned above there can be dispatched to these processor cores and great performance can be achieved in very low cost.

In the following embodiments, more attention is focused on processing images taken from gravity-like environment, e.g. on Earth, Moon or Mars. The super pixels are obtained so as to be further clustered. Thereafter, the clustered pixel sets are classified as sky, vertical object or ground object for performing applications like machine vision and machine recognition. Different probability distribution functions are applied to these pixel sets to obtain expected values for determining category of a pixel set is belonged to.

The aforementioned method may also be implemented in an electronic apparatus that has a super pixel module for grouping pixels in an image into super pixels and has a recognition module for further using the super pixels to perform machine vision or other applications. These modules may be implemented with corresponding hardware, software or their combination to achieve the desired functions.

According to an embodiment of the present invention, a method is provided for specifying a pixel set in an image into one category among multiple candidate categories in an electronic system. The method may include following steps.

A feature database is provided via machine learning or any other method, e.g. classification manually by human. A texture feature is calculated for the pixel set. The texture feature is compared with the feature database to determine whether the texture feature of the pixel set is close to any pre-stored feature of the multiple candidate categories by the electronic system. If a pre-stored feature is matched, the category of the pixel set is specified accordingly.

In addition, even a pixel set may be further divided into a first part and a second part, and the first part and the second may be compared with different feature databases. Specifically, it is found that when a pixel set is divided into an outer area as the first part and an inner area as the second part, the first part and the second part may be compared with different feature database to more accurately determine the category of the pixel set. Please be noted that more than two parts may also be applied for different requirements.

There are various texture features that may be calculated for achieving different goals. For example, a vector of the pixel set for indicating energy distribution may be calculated as the texture feature. To calculate energy distribution, there are many algorithms. For example, wavelet transformation may be applied to a pixel set to extract energy information. When wavelet transformation is applied, a pixel or a pixel set may be transformed into $e_{LL}$, $e_{LH}$, $e_{HL}$ and $e_{HH}$ components and $e_{LL}$ may be used as a major reference for determining whether the pixel set is an architecture object or a sky object. The type of the sky object mentioned here may refer to cloud and air that has different energy distribution compared with architecture objects.

In addition, line segments may be extracted from each pixel set of the image. The line segments are pixel sets that have more fierce changes compared with surrounding pixels. The line segments are usually edges of objects. When line segments in pixel sets are extracted, they may be further analyzed statistically. For example, a histogram illustrating distribution of line segments in different directions may be calculated to have an overall aspect for a pixel set or an image.

Please be noted that it is found that architectures and plant objects have different line segment distribution on line segment directions. Usually, natural plants would have more random direction line segments than human made architecture objects.

In addition, the color may also be used for enhancing correctness of determination. When color is used as a tool, choosing a proper color space is important. In the following embodiments and illustrated applications, CIELAB and similar color spaces are preferred.

There are various color spaces. A preferred color space to be chosen for the following application is a color space having a luminance component and two color opponents. For example, CIELAB color space has three components, L, A, B, where L refers to luminance value and A, B refer to color opponent values.

After choosing a proper color space, it is noted that the angle of color opponents, e.g. A, B in CIELAB color space, between two color vector may provide helpful information for classification of objects. Nature plant objects may be further classified into several common categories as candidate categories. The pixel set is compared with these pre-stored texture features to find whether a close texture feature is identified for the purpose of classification. Please be noted that it is particularly helpful on distinguishing architectures from natural plants like tree, or grass yard.

In addition, the pixel set may refer to the whole image, and texture feature as mentioned above may refer to accumulated lengths of line segments in different directions. Please be notated that it is found particularly helpful by examining the distribution of line segment accumulated lengths. For example, such method is very effective on identifying whether there are architectures nearby in the image. By knowing whether there are nearby architectures, it is helpful to avoid some recognition errors and pick a proper strategy for machine recognition.

To do such work, a window function that filters and sums accumulated values in certain ranges may be applied. Further details may be found in following examples. Besides, please be noted that a proper selection of pixel sets plays a critical role in achieving high recognition.

A method is provided for recognition of a sky portion, a vertical object portion and a ground portion in an image executed in an electronic system. The image is divided into a plurality of pixel sets by the electronic system. Expected values of each pixel sets with a sky distribution function, a vertical object distribution function and a ground distribution function are calculated by the electronic system.

The distribution probability of the sky distribution function is decreasing from the top of the image, the distribution probability of the ground distribution function is decreasing from the bottom of the image and the distribution probability is decreasing from a vision horizon line to upper side and to lower side of the image. The probability in these distribution functions may have negative values to obtain better performance.

Please be noted that in some cases, the horizon line may be determined in advance. For example, the camera angle for taking the image to be processed may be known in advance if such information is recorded with the image. In addition, when the camera is installed on a robot or a car, the camera angle may be determined in real time to adjust the vision horizon line. The distribution function may be adjusted corresponding to the vision horizon line to provide a more accurate determination of objects.

The expected values of each pixel set in the sky distribution function, the vertical object distribution function and the ground distribution function are computed to determine whether each pixel set belongs to a sky object, a vertical object or a ground object.

A method is provided for recognition of a ceiling portion, a vertical object portion and a ground portion in an image of indoor scene executed in an electronic system. The image is divided into a plurality of pixel sets by the electronic system. Expected values of each pixel sets with a ceiling distribution function, a vertical object distribution function and a ground distribution function are calculated by the electronic system.

The distribution probability of the ceiling distribution function is increasing upwardly from a ceiling line of the image. The distribution probability of the ground distribution function is increasing downwardly from a ground line from the top of the image. The distribution probability is decreasing from a vision horizon line to upper side and to lower side of the image.

The expected values of each pixel set in the ceiling distribution function, the vertical object distribution function and the ground distribution function are compared to determine whether each pixel set belongs to a ceiling object, a vertical object or a ground object.

The ground line and the ceiling line may be calculated by following steps. First, ceiling pixels and ground pixels for each row of the image are counted. The ceiling pixels are pixels in one of the pixel sets classified as a ceiling object, and the ground pixels are pixels in one of the pixel sets classified as a ground object.

A ceiling average value and a ceiling deviation value of numbers of the ceiling pixels among different rows of the image are also calculated. A ground average value and a ground deviation value of numbers of the ground pixels among different rows of the image are also calculated. After the ceiling average value and the ground deviation value are calculated, the counted ceiling pixels and ground pixels in a certain range are respectively re-selected according to the ceiling average value, the ceiling deviation value, the ground average value and the ground deviation value.

The re-selected ceiling pixels and ground pixels are used for finding adjusted ceiling line and ground line that have least distance from the vision horizon line. Afterwards, the ceiling, vertical object and ground distribution functions are adjusted for computation of next iteration. After multiple iterations, more and more vertical objects are found to achieve better accuracy of recognition.

To obtain better result, it is found that the probability in different corresponding portion of pixel position in the ceiling distribution function, the vertical object distribution function and the ground distribution function may be set as negative values.

In another preferred embodiment, a method for processing images in an electronic system is provided. Multiple pixel sets of an image are mapped to a color space that includes a color sub-space and a luminance sub-space, the color sub-space substantially associating to visible light frequencies. For example, the color space is the CIELAB color space, the color sub-space is the (A, B) sub-space and the luminance sub-space is the L sub-space.

The multiple pixel sets are classified into at least a first type of pixel sets and a second type of pixel sets according to features of the multiple pixels in the color-subspace. Such pixel sets may be super pixels as mentioned above or groups of super pixels, or any kind of pixel sets containing one or more than one pixels. The feature may be the average purity, e.g. the norm of the (A, B) vectors in CIELAB color space. When the average purity of a pixel set is larger than a predetermined level, which means the pixel set in average has a more pure color, which is more distinguishable by human eyes, the pixel set is classified into the first type. Otherwise, the pixel set is classified into the second type, in which the luminance information is considered as a major factor for processing mentioned as follows.

Specifically, one pixel set is classified into the first type of pixel sets if the pixel set has a norm larger than a predetermined threshold, and the pixel set is classified into the second type of pixel sets if the pixel set has a norm smaller than the predetermined threshold, because the norm in the color sub-space.

A first statistic distribution is generated, like a histogram, for the first type of pixel sets over corresponding visible light frequencies of the first type of pixel sets. For example, the pixel sets are counted into ranges of corresponding polar angles in the (A, B) sub-space to form histogram of the first statistic distribution.

A second statistic distribution is generated, like another histogram, for the second type of pixel sets over corresponding luminance values of the second type of pixel sets. For example, the pixel sets are counted into ranges of corresponding luminance L sub-space for form histogram of the second statistic distribution.

The first type of pixel sets and the second type of pixels are joined respectively to generate multiple pixel blocks. In other words, the pixel sets in an image may be divided into either the first type or the second type. Then, these pixel sets are separately jointed according to different color factors, i.e. the purity or the luminance values. Please be noted, nevertheless, that more than two types are also covered in the invention scope under the same inventive spirit.

In addition, the first statistic distribution and the second statistic distribution respectively may correspond to visible light frequency values and luminance values that may be respectively divided into multiple ranges, and the first type of pixel sets and the second type of pixel sets may be counted into histograms of these multiple ranges to obtain the first statistic distribution and the second statistic distribution.

The peak values of the histograms of the first statistic distribution and the second statistic distribution are identified and used for joining the multiple pixel sets into the multiple pixel blocks further by reference to geographic positions of the multiple pixel sets. For example the peak values are identified and then an predetermined offset around these peak values are used for finding pixel units falling within the ranges defined by the peak values and the predetermined offset to be joined together if the pixel units are also located in neighboring area.

Such processing may be performed in multiple iterations. Specifically, the multiple pixel blocks may be regarded as new multiple pixel sets and taken as input for performing a new iteration of the first statistic distribution and the second statistic distribution to further joining the new multiple pixel sets.

Such processing is very suitable to be executed by multiple processors in parallel. Specifically, the first statistic distribution and the second statistic distribution are performed by multiple processing threads that are allocated to be executed by multiple processor hardware components in parallel. In many applications, the processing timing is a critical concern. For example, auto-pilot applications need real time recognition of image objects.

The continued processing may include, but not limited to, analyzing features of the multiple pixel blocks to categorize the multiple pixel blocks into different types of objects. Furthermore, such processing may be integrated with various machine intelligence technologies like deep learning, support vector machine classification or any other machine learning methods.

The pixel set may refer to super pixels as mentioned above. Such super pixels may use similar factors as mentioned above. For example, the color of a pixel is mapped to a CIELAB color space. In addition the pixels are classified into a first type and second type just like what is performed to the pixel sets. For different types, different pixel grouping are applied or different factors of the pixels are used for obtaining the super pixels.

A continued processing is performed to the image using the multiple blocks. Under examples and experiments as explained as follows, the pixel sets are joined much more accurately compared with known methods. Various applications like auto-pilot applications, machine vision or image processing like Photoshop software may be built based on such processing.

BRIEF DESCRIPTION OF DRAWINGS

FIG. 15 illustrates different objects of different categories having different wavelet vector characteristics;

FIG. 43 illustrates a real experiment under the preferred embodiment;

FIG. 44 illustrates another real experiment under the preferred embodiment;

DETAILED DESCRIPTION

Machine vision is critical for developing various useful applications. For example, autopilot for a car, an airplane, a missile, a robot or any machine need machine vision to recognize objects or extract information from images captured via cameras that provide one viewpoint or multiple viewpoints. For examples, a camera captures an image from a scene and provides a view of the scene from one viewpoint. To simulate three-dimension perspective of human vision, two cameras located at two locations may be used for capturing two images that provide three-dimension information after comparing the two images. Furthermore, laser, radar or other mechanism may be also applied for processing the images to get more information. In the following embodiments, some embodiments are particularly useful for extracting three-dimension information or recognizing objects from a single viewpoint image, but that should not be regarded as limitation for the scope of the present invention. For example, some techniques may be applied to image processing software or hardware.

Figure 1:
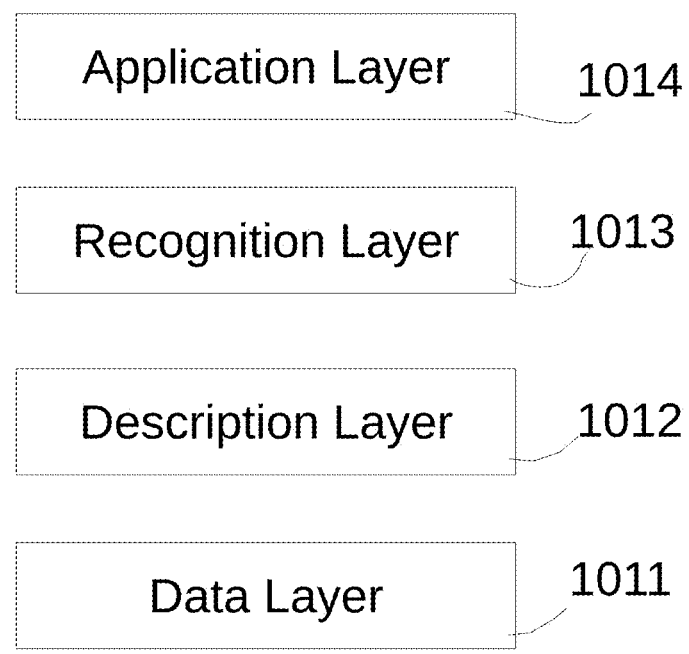
FIG. 1 is a logic diagram illustrating data processing architecture of an embodiment of the present invention.

Please refer to FIG. 1. FIG. 1 is a diagram illustrating a data processing architecture used for an embodiment of the present invention. First, images may be processed in various modules in the data layer 1011 under different design requirements. For example, different filters may be applied on images for eliminating noises, enhancing image quality, smoothing, color adjusting, etc.

After images are pre-processed, the description layer 1012 may further process these images to group the pixels of the image into super pixels, or even to group multiple super pixels into pixel clusters according to texture, color, gradient or other characteristics. Such processing may help dramatically decrease the complexity of processing. For example, a raw image may have 5,000,000 pixels that are common for a simple camera. Without grouping the pixels into pixel units that contain multiple pixels, it may take hours or days to extract simple information from an image of 5,000,000 pixels in machine vision. Therefore, it is important to find one way or another to group pixels that better match the objects in an image.

For MPEG or similar video compression applications, an image is divided into blocks of 16×16 pixels to decrease computation complexity. However, pixel grouping with more irregular shapes that match objects in an image would provide better effect in continued processing.

The recognition layer 1013 is used for recognizing object or extracting information of an image based on processing results of the description layer 1012 and the data layer 1011. The application layer 1014 further uses the information of the recognition layer 1013, e.g. three-dimension depth information, and achieves different functions like autopilot or augmented reality applications.

When top layers rely on information accuracy from lower layers, it is therefore important to find better approaches in both data layer 1011 and description layer 1012 to avoid error propagation in processing of the recognition layer 1013 and even the application layer 1014. In the following description, methods for grouping pixels into super pixels and grouping super pixels into pixel clusters are explained.

Figure 2:
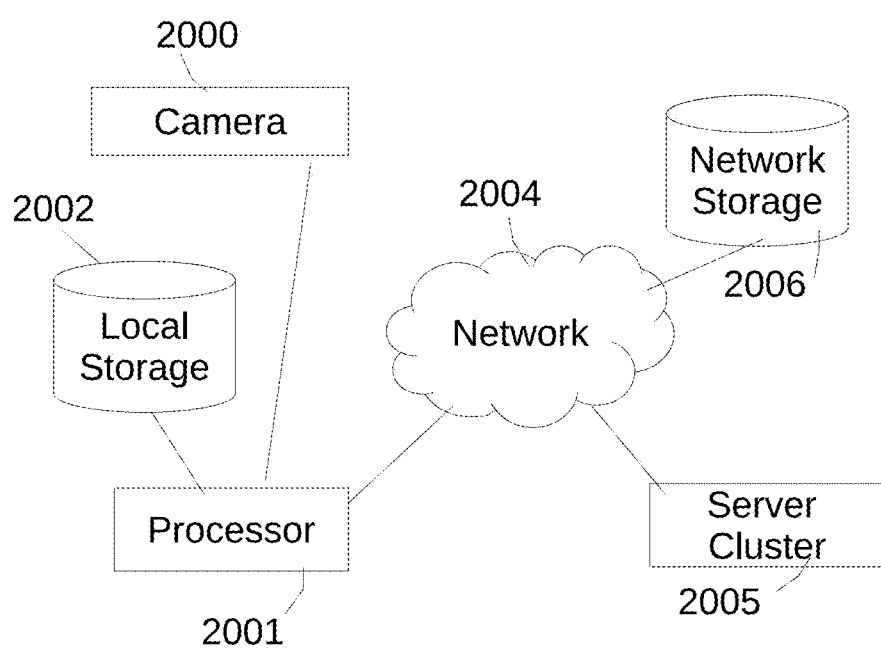
FIG. 2 is a diagram illustrating hardware arrangement of an embodiment of the present invention.

FIG. 2 is a hardware aspect illustrating an example of an electronic system of a preferred embodiment according to the present invention. A camera 2000 is operated by a processor 2001 to capture images on external scenes to be stored in a local storage like a flash card, a hard disk, or any type of memory device. In an alternative implementation, the camera 2000 is not necessary and images may be captured in advance from other cameras. The processor 2001 may perform all calculation and operation of the data layer 1011, the description layer 1012, the recognition layer 1013, and the application layer 1014 of FIG. 1. Driverless cars, unmanned air vehicles, smart explorers on Mars or other standalone devices that need to analyze information from images in real time for controlling associated mechanical components are examples of such implementation.

Alternatively, part of calculation and operation may be dispatched to one or more external devices. In FIG. 2, some computation tasks may be transferred to a server cluster 2005, and a network storage 2006 may be used for storing necessary information via a network 2004. Such implementation is particularly helpful when a processor 2001 has limited computation power. For example, when the processor 2001 is a mobile phone or a portable device, images that need to be processed may be transmitted to the server cluster 2005 in a remote site to perform necessary computation explained as follows. In addition to the two examples, other types of implementation may be designed for different types of applications and are covered within the scope of the invention.

Figure 3:
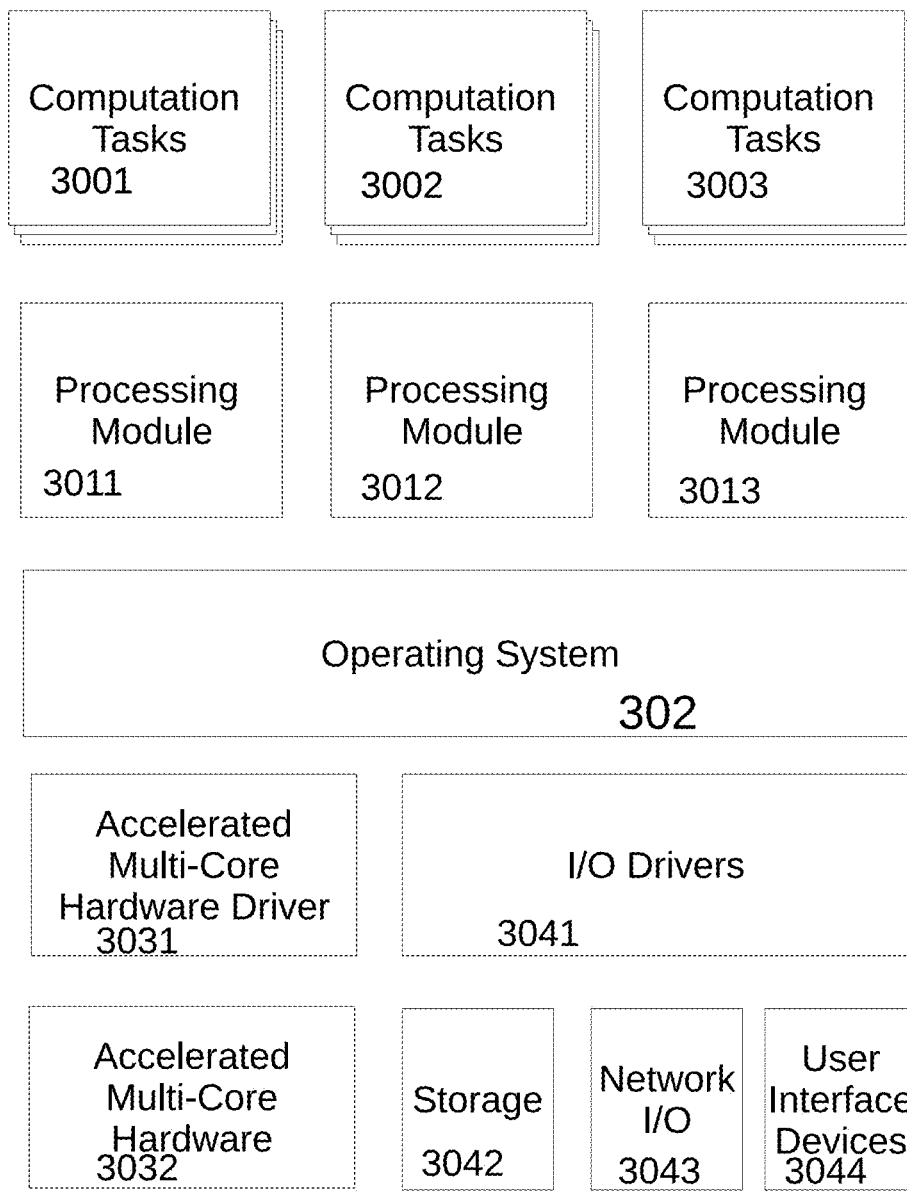
FIG. 3 is a diagram showing inner processing architecture of an embodiment of the present invention.

FIG. 3 illustrates an embodiment for implementing an application of machine vision. In this embodiment, multiple processing modules 3011, 3012, 3013 may be coded with various programming languages like C, C++, Objective C, Python, Perl, Ruby, Java, JavaScript, assembly or machine language for implementing super pixel grouping, color space calculation, super pixel clustering, distribution function and expected values calculation, depth information calculation, mechanical component controlling, or any operation that is necessary for different applications. Theses processing modules 3011, 3012, 3013 handle one or more computation tasks 3001, 3002, 3003 for calculation or operation in the data layer 1011, the description layer 1012, the recognition layer 1013 and/or the application layer 1014. For example, a computation task may refer to distance calculation among a portion of pixels in an image. The processing modules 3011, 3012, 3012 may access the accelerated multi-core hardware driver 3031 or the I/O drivers 3041 via the operating system 302 like Mac OSX, iOS, Windows, Linux, Unix, or any proprietary system made by manufacturers. The accelerated multi-core hardware driver 3031 and the I/O drivers may further operate associated hardware like the accelerated multi-core hardware 3032, the storage 3042, the network I/O 3043 or various user interface devices 3044.

The accelerated multi-core hardware 3032 may refer to an accelerated graphic card, an accelerated graphic chip, or any circuit that provide multi-core computation hardware. The storage 3042 may refer to flash memory, DRAM, hard disk, or any types of memory devices. The user interface devices 3044 may refer to a keyboard, a mouse, a display, an audio, a camera, a network interface, etc.

For example, super pixel grouping involve lots of computation on distance among pixels. Such computation may be divided into multiple computation tasks 3001 by corresponding processing module 3011. These computation tasks 3001 are assigned to into threads on the operating system 302. Each thread may be associated to a processor core of the accelerated multi-core hardware 3032. In other words, super pixel grouping may be calculated in parallel on different processor cores in the same time to enhance performance that is necessary in certain real time applications like autopilot.

Figure 4:
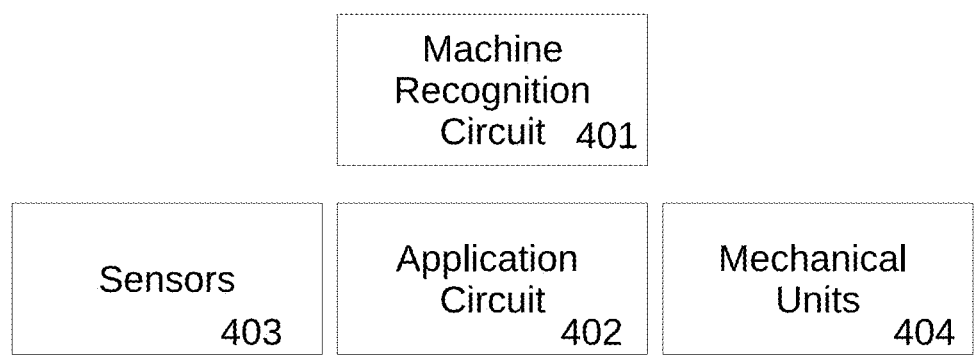
FIG. 4 is a diagram illustrating a robotic application according to an embodiment of the present invention.

FIG. 4 is a diagram illustrating a general architecture of a type of embodiment that is an application with mechanical components like a driverless car, a missile, an unmanned vehicle, or a robot. In such application, one or more than one sensors 403 like one or more than one cameras collect images captured from environment scenes. Laser distance detector, radar detector, GPS, temperature, timer or other sensors that collect information may also be placed in such application to provider further information. The images as well as related information are supplied to the application circuit 402 that is used as the major controller for the application. To extract information of the images, the images are supplied to the machine recognition circuit 401 to perform machine recognition, including related processing like super pixel grouping, clustering and other calculation to be explained as follows.

The recognition result from the machine recognition circuit 401 are further combined with pre-stored logic rules in the application circuit 402 to construct corresponding instructions to control, trigger and/or operate associated mechanical units 404 like motors, valves, signal output.

Figure 5:
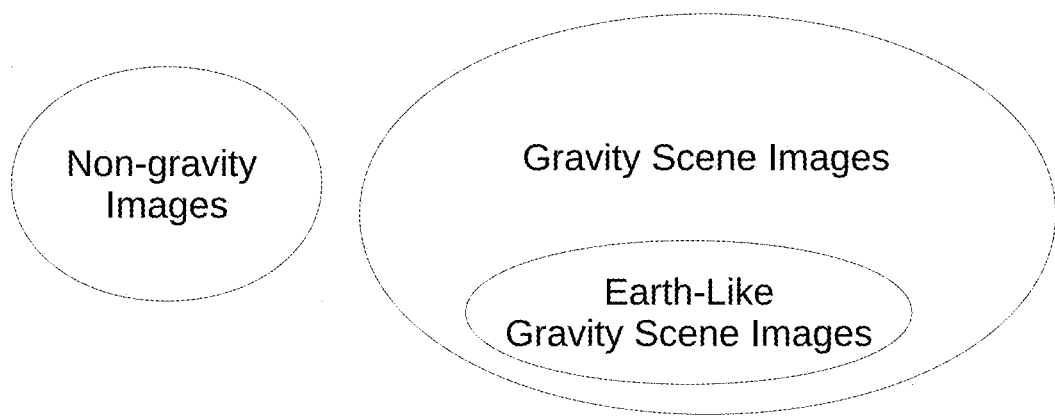
FIG. 5 illustrates different types of images to be processed.

FIG. 5 illustrates different types of images and particular types of images that the embodiments described herein are particularly helpful thereon. First, gravity scene images refer to images taken or drawn based on scenes under gravity. Specifically, gravity scene images may refer to images containing objects located and operated under certain gravity field. Furthermore, the gravity scene image type may have an earth-like gravity scene image type, in which images contain objects affected under earth-like gravity. For examples, indoor or outdoor images are taken on earth, on Mars, or on Moon and illustrate objects like ground, sky, mountains, rivers, buildings, trees, tables, ceilings, walls, etc. In earth-like gravity scene images, objects stand following the application of gravity and appear in certain order. In contrast with non-gravity images, earth-like scene images have some implicit information that may be used for identifying and/or recognizing objects therein.

Figure 6:
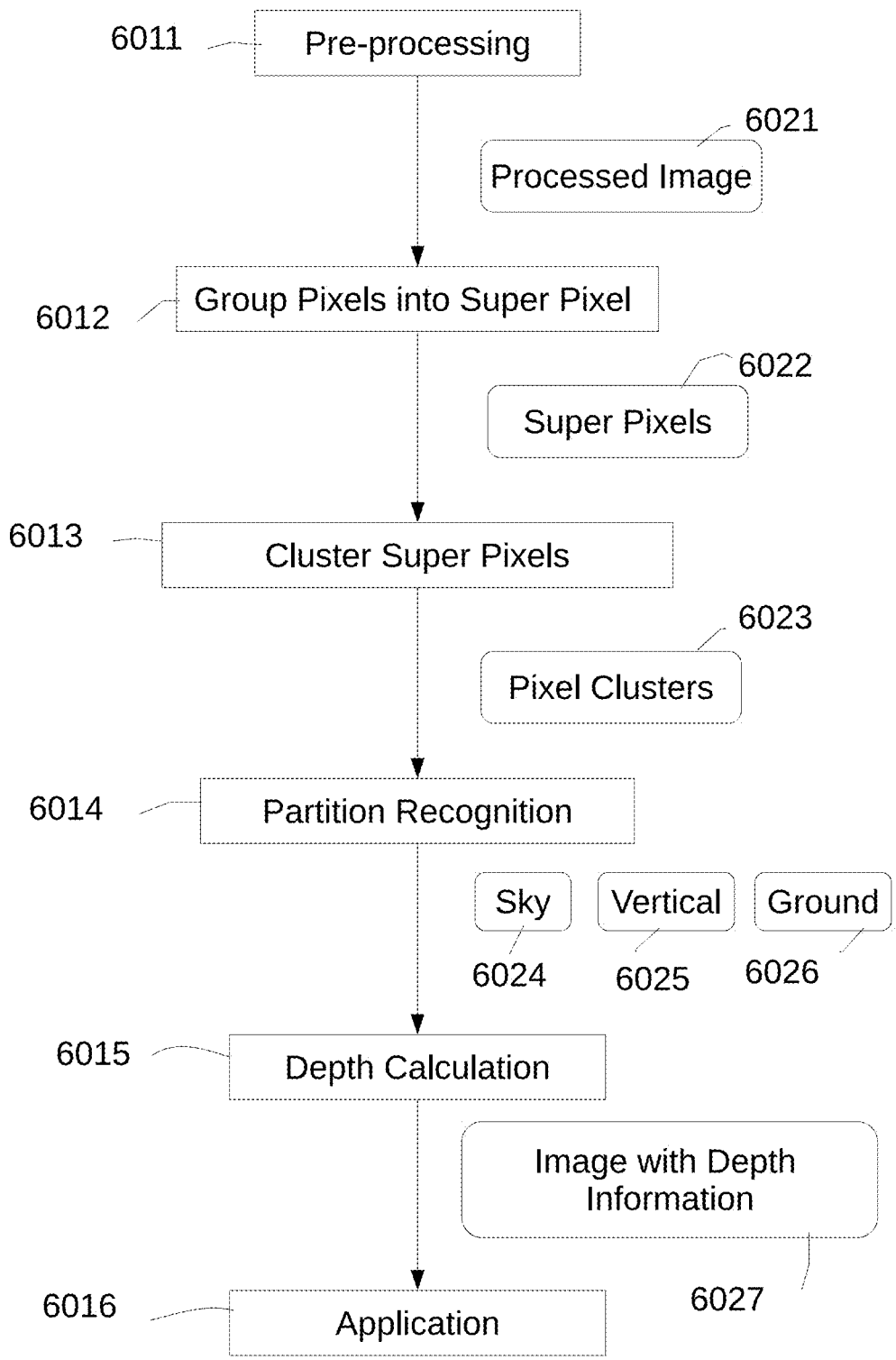
FIG. 6 is a flowchart illustrating a processing method according to an embodiment of the present invention.

FIG. 6 is a flowchart illustrating a general processing flow that can be used in various applications. First, an image or a series of images are captured from a camera or retrieved from a storage and is pre-processed (step 6011) for one or several adjustment or transformation. For example, the size of an image is changed, an encoding color space of an image is transformed into another color space, an image is extracted from a compressed video stream, and/or color adjustment for enhancing certain color components of an image is applied. After the pre-processing, an original image input is converted into a processed image 6021.

Usually, the pixel number of an image is not small. For example, an image taken by a common camera may have over 5 million pixels or even more than 20 million pixels. Without proper down scaling, it would be difficult to perform recognition computation under such big number of pixels. It is therefore important to find an effective way to decrease the processing scale while keeping necessary information.

One way of doing this is to group pixels into super pixels 6022 (step 6012). A super pixel refers to a pixel set that contains adjacent pixels having more similar characteristics to each other in the pixel set compared with similarity to other pixels in adjacent super pixels. There are various ways to classify pixels into super pixels, with rectangular shapes or irregular shapes. Accuracy of grouping for super pixels is important because errors may propagate from initial stage to later stage. In the following description, several effective ways, including criteria to determine similarity between two pixels as basis for super pixel grouping, are provided for reference.

When pixels are grouped into super pixels, the computation scale is lowered down. If ten pixels in average are grouped into a super pixel, the computation base is quickly down to 10%. The super pixels may be further clustered (step 6013) into pixel clusters 6023. An object, like a building or sky, in an image may be composed of multiple super pixels. Under different strategies or requirements, the resolution may be different. For example, super pixels corresponding to a window object in an image may be grouped into a pixel cluster. Alternatively, super pixels corresponding to a building that contains the window object in the same image may be grouped into a pixel cluster under different clustering resolution. In other words, an image may be clustered into sky objects, vertical objects and ground objects. The same image may be clustered into window objects, cloud objects, and other objects under a more detailed resolution.

These pixel clusters may be analyzed to determine what type of objects these pixel clusters might belong to. For an important image category, an image is composed of sky objects 6024, vertical objects 6025 and ground objects 6026. The term vertical object may refer to any object that is not sky or ground but objects existed between sky and ground. Each object may contain one or more than one pixel clusters. Furthermore, same type objects may be grouped together to obtain several partitions of an image (step 6014). For example, an image is divided into a sky partition, a vertical object partition and a ground partition. The sky partition contains all pixel clusters of sky objects, the vertical partition contains all pixel clusters of vertical objects, and the ground partition contains all pixel clusters of ground objects.

When an image is divided into a sky partition, a vertical partition and a ground partition, pixel color graduation may be further analyzed to perform depth calculation (step 6015) to obtain an image with depth information 6027. With depth information, three-dimension information of a flat image is extracted and may be used in various applications (step 6016) like auto pilot mechanism.

Please be noted that the illustrated stages in the flowchart of FIG. 6 is not used to limit the scope of the present invention. For example, instead of clustering super pixels into pixel clusters, super pixels may be directly partitioned into required types. The step of pre-processing may also be eliminated if necessary. In addition, pixels in an image may be grouped into different super pixels under different methods in a single application. Other variations may be applied and each step is explained in more details as follows.

Figure 7:
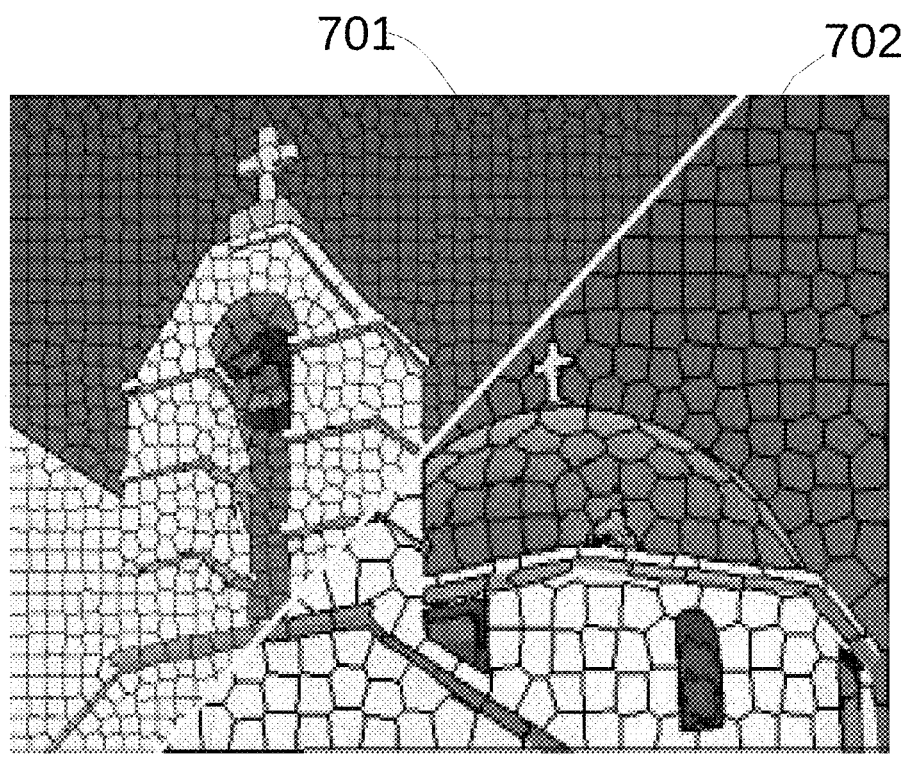
FIG. 7 illustrates super pixels in an image.

FIG. 7 illustrates pixels of an image being grouped into super pixels under two different sets of parameters. As mentioned above, grouping of super pixels is a processing to find adjacent similar pixels. Under different parameters like distance ranges, different result of super pixel grouping may be obtained. In the upper left portion 701, pixels are divided into bigger blocks than the pixels in the bottom right portion 702. A bigger block setting brings lower computation complexity in later stage processing. Nevertheless, a bigger setting may also cause pixels belong to different objects to be grouped in the same super pixel. It is therefore helpful choosing a proper parameter set when grouping pixels into super pixels. Under different types, different parameter sets may bring better performance. When an image type of an input image is known, an associated parameter set may be applied. If the image type of the input image cannot be determined in advance, more than one parameter sets may be applied for testing to get an optimized result.

Figure 8:
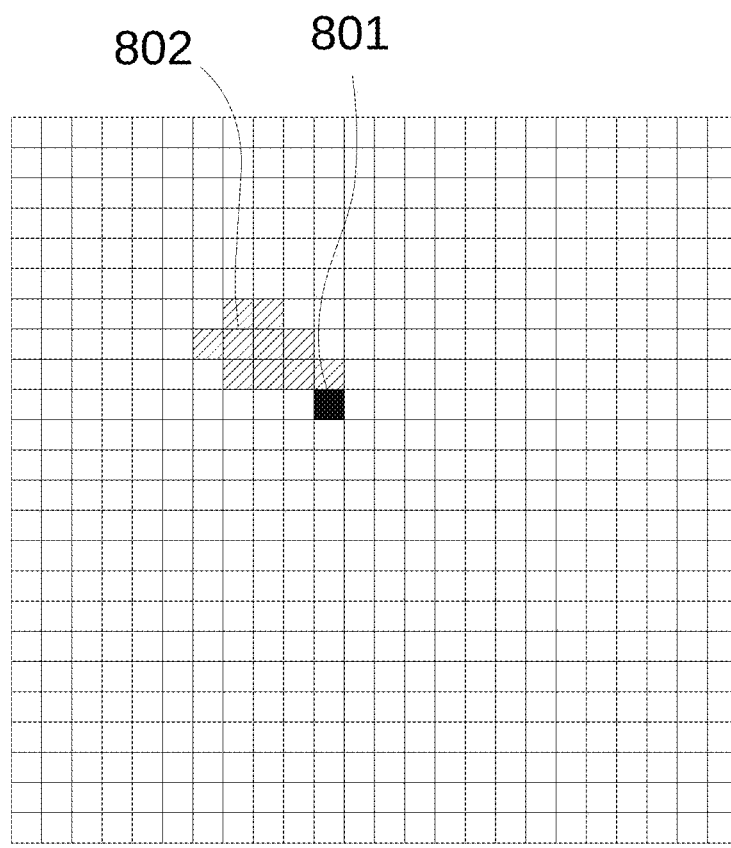
FIG. 8 illustrates calculating a combined distance between a seed pixel and a proximal pixel.

FIG. 8 illustrates an idea for grouping pixels into super pixel. First, a group of pixels are selected as seed pixels. For example, an image may be divided into 10,000 blocks and in each block, a pixel in the center of each block is selected as a seed pixels. Next, pixels around the seed pixels within a predetermined distance range are regarded as proximal pixels. Similarity between these proximal pixels and associated seed pixels are calculated. For proximal pixels having similarity more than a predetermined threshold with respect to one seed pixel, these proximal pixels are grouped together. When pixels in an image are grouped under such method, a new seed pixel may be selected from each group and another iteration of similarity computation and grouping may be applied. After multiple iterations when such grouping result is more stable, each group of pixels may be regarded as a super pixel.

A major factor to obtain a better super pixel grouping relies on a more accurate way to determine similarity between two pixels. Because an image is composed of pixels and each pixel has a color value, which is usually a color vector in a color space, a metric for representing similarity between pixels may in certain aspect be regarded as a distance or say a color distance between the two color vectors in the color space. There are various color spaces, and it is found in the present invention that color spaces like CIELAB similar to human vision perception on visible light spectrum are particularly helpful on calculating similarity between pixels.

Figure 9:
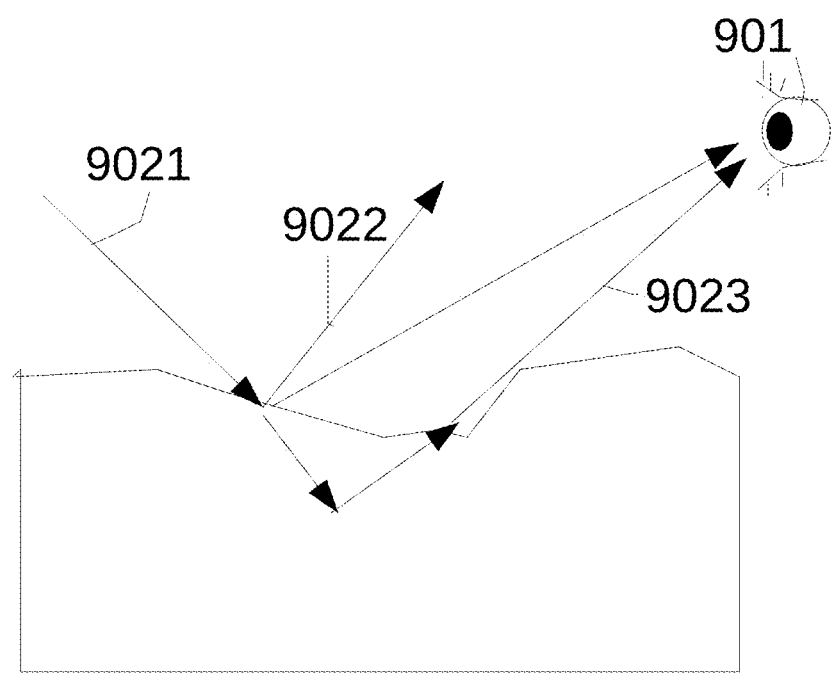
FIG. 9 illustrates how light is moved to form the vision in an eye.

FIG. 9 illustrates how color information is collected by human eyes or cameras. When light is emitted from a light source 9021, the light may be reflected 9022 from a surface of an object and/or enter part of surface of the object and refracted 9023. Along the path of light transmission, a portion of light may be absorbed or redirected under various factors. Besides, depending on different positions of human eyes 901 or cameras, different integrated light information is collected for representing a particular point on an object. By analyzing an image, the information like texture characteristics of objects or positions for taking the image may be extracted to reconstruct necessary data to recognize objects in an image.

An image in a digital device is usually captured by a camera with a sensor array, and each sensor unit in the sensor array captures light from objects and environment at the position of the camera. Usually, each sensor unit detects the light and generates an associated color vector composed of Red, Blue and Green. After certain compression, such data are stored as a compressed image file like a JPG file or non-compressed raw files.

As mentioned above, there are several common types of color spaces. A first type is developed based on device characteristics like the color space used in common cameras. For example, a display usually generates a color via mixture of red, green and blue. Such color spaces may include RGB, HIS, HSL and HSV. A second type is not directly related to devices and may be used as intermediate space during transformation between two color spaces. Such color spaces developed by CIE include CIE 1931 XYZ, L*a*b, L*u*v and LCh. A third type is particularly designed for video compression and transmission like YUV, YIQ, ITU-R, BT-601 Y'CbCr, ITU-R, BT.709 Y'CbCr and SMPTE-240M Y'PbPr.

The color value of a pixel may be converted from one color space to another color space due to different needs. For applications with machine recognition, visible light spectrum perceived by human vision is found particularly helpful in the present invention. Specifically, A typical human eye will respond to wavelengths from about 390 to 700 nm. It is found the frequency position in the visible spectrum provides important information for machine recognition of images. Similarity between two pixels may be determined by different criteria. Nevertheless, it is valuable to find that for machine recognition of images, the frequency difference, i.e. the position distance in a visible spectrum, of the two pixels is helpful on super pixel grouping.

Among the color spaces, CIELAB including CIELab and CIEL*a*b is very helpful on finding such difference. In the color space of CIELAB, the color of a pixel is composed of a vector of (L, A, B). L is basically associated with luminance strength. A indicates a related position between red and green and B indicates a related position between blue and yellow.

Figure 10:
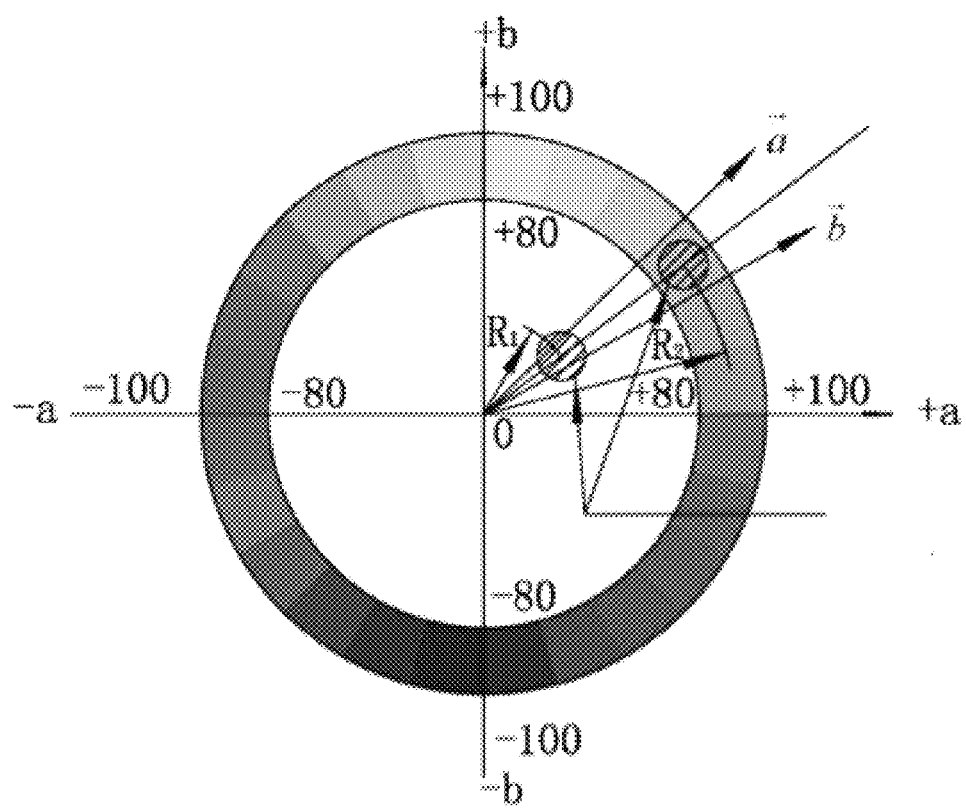
FIG. 10 illustrates angle difference between pixel color ranges.

FIG. 10 illustrates a subspace of CIELAB. The vector (A, B) for a pixel under the CIELAB color space is associated to a point in the illustrated coordinate system. Under polar coordinates, each such point has a polar angle. The angle difference between two such points of two pixels in the coordinate system may be used to indicate a distance of the two pixels on the visible spectrum. Therefore, similarity may be determined by calculating the polar angle difference in (A, B) subspace of CIELAB.

It is an effective and efficient option but should not be regarded as a limitation of the present invention. Any other method that is used for measuring a distance of two pixels on a visible spectrum should be regarded equivalent to the polar angle difference under CIELAB and may be used during implementation of the present invention.

Furthermore, it is important to find in the present invention that when colors of two pixels have lower polar lengths under polar coordinates in (A, B) subspace of CIELAB, i.e. the norm value of a (A, B) vector under CIELAB, it is difficult for human eyes to distinguish difference between the two pixels. Such finding may be applied for machine recognition in the present invention.

An embodiment for applying such finding is to set a threshold of polar length of (A, B) component. When two pixels have corresponding polar length smaller than the predetermined threshold, the luminance component L of the two pixels is used a major reference to indicate the difference between the two pixels. On the other hand, when two pixels have corresponding polar length larger than the predetermined threshold, the luminance component L of the two pixels may be basically ignored and the polar angle difference between the two pixels is used a major reference to indicate the difference between the two pixels.

Figure 11:
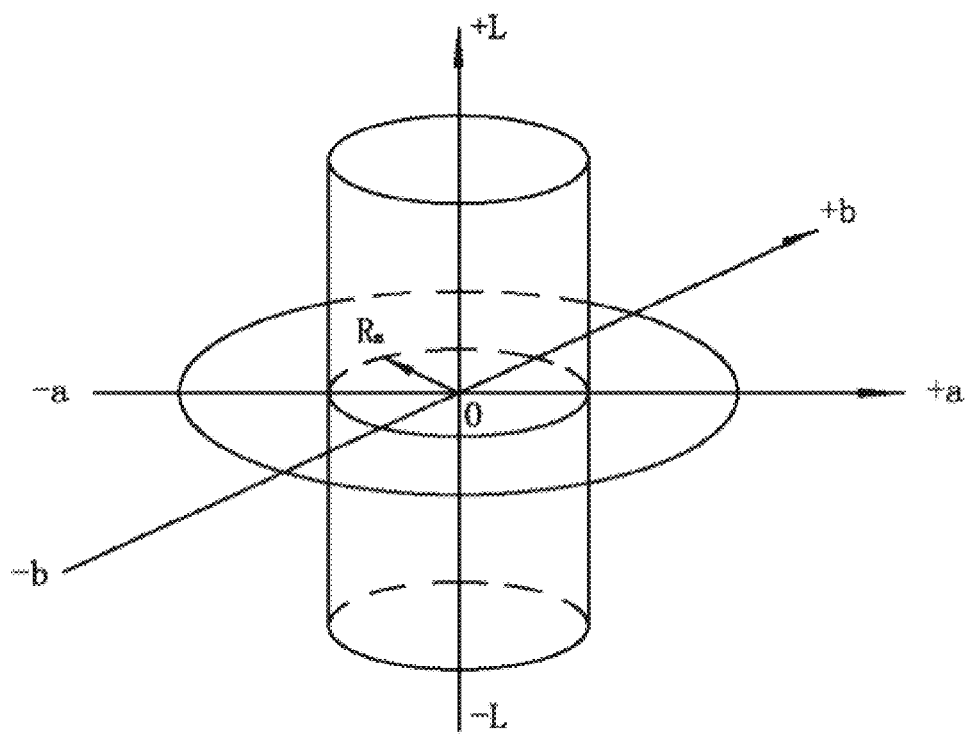
FIG. 11 illustrates a modified use for calculating color distance in a color space.

FIG. 11 illustrates a three-dimension coordinate system of CIELAB. As mentioned above, for pixels with polar length within the predetermined threshold Rs, the L component of the pixels is used as a major index for finding difference between two pixels on machine recognition application like super pixel grouping. On the other hand, for pixels with polar length within the predetermined threshold Rs, the polar angle of the pixels is used as a major index for finding difference between two pixels on machine recognition application like super pixel grouping.

Figure 12:
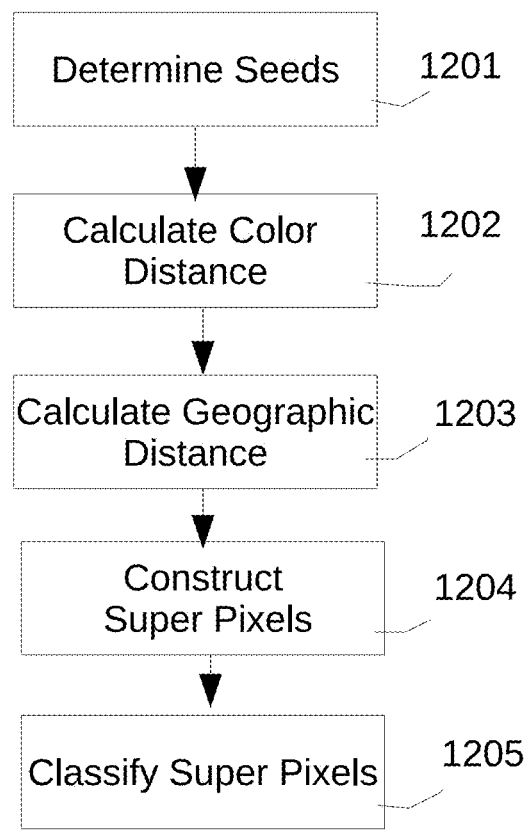
FIG. 12 illustrates a flowchart for finding super pixels in an image.

FIG. 12 is a flowchart for illustrating super pixel grouping in which the aforementioned polar angle difference between two pixels may be used for determining the difference between the two pixels.

First, seed pixels are chosen from an image (step 1201). The color similarity of the seed pixels and their proximal pixels are calculated (step 1202). For example, color vectors in CIELAB of the seed pixels and their proximal pixels are calculated and their polar angle differences on sub space of (A, B) are also calculated. As mentioned above, when the polar lengths, i.e. the norms, of the color vectors in the sub space (A, B) are smaller than a predetermined threshold, the luminance component L is used for indicating the difference between the seed pixels and corresponding proximal pixels. The color difference may be regarded as a color distance in the color space.

In addition, geographic distance between the seed pixels and their proximal pixels may also be taken into consideration. Specifically, geographic distance between seed pixels and their proximal pixels are calculated (step 1203). In other words, pixels that are located more near the seed pixels may be assigned a bigger chance to be grouped as into super pixels of the seed pixels.

In short, both the geographic distance and the color distance are considered to construct super pixels (step 1204). Such operation may be executed in multiple iterations to get more accurate grouping of supper pixels. When the super pixels are obtained, super pixels may be classified into categories (step 1205) for further machine recognition of images.

Several skills are provided as follows to enhance the super pixel grouping processing.

First, there are lots of calculation, including the geographic distance and the color distance, need to be performed. These calculation tasks may be dispatched to multiple hardware processors to be executed in parallel. For example, multiple threads associated with different processor cores on an accelerated graphic card may be forked for these calculation tasks.

Second, a color distance between two pixels may be composed of three elements with different parameters adjusted according to different situations.

The color distance may be defined as follows:

$$Dst_{nm1} = \alpha|\theta_1 - \theta_0| + \beta|m_1 - m_0| + \gamma|L_1 - L_0|$$

where $Dst_{nm1}$ refers to the color distance, $\theta_1$ and $\theta_0$ refer to polar angles of the two pixels in (A, B) sub space of CIELAB, m1 and m0 refer to the norms, i.e. the polar lengths, of the two pixels in (A, B) sub space of CIELAB, $L_1$ and $L_0$ refers to luminance component L of CIELAB, and $\alpha$, $\beta$, $\gamma$ refer to weighting of the three elements.

As mentioned above, $\alpha$ may be given a higher value so that the color distance is mainly determined by the polar angle difference. Besides, when the norms of the two pixels are smaller than a predetermined threshold, $\gamma$ may be given a higher value. On the other hand, when the norms of the two pixels are larger than the predetermined threshold, γ may be given a lower value or even zero to focus to eliminate the influence of luminance component on calculating distance.

Alternatively, images may be classified into different types and α, β, γ may be adjusted differently in different types of images to gain best performance. Even in an image, different image parts may be further given different weighting if these image parts are identified as certain type in a preliminary recognition.

Furthermore, for image of outdoor scenes taken in night time, γ may be given a lower value. Other circumstance information may be used for adjusting the parameter of α, β, γ for optimization.

Third, as mentioned above, geographic distances between pixels are also calculated as reference with the color distance to determine similarity between pixels. When images have different sizes, normalization is applied to the distance and the geographic distance and the combined distance between two pixels may be defined as follows:

$$Dst_{xy} = \psi|(|x_1-x_0|+|y_1-y_0|);$$

$$Dst = Dst_{nm1} + Dst_{xy}$$

where $Dst_{xy}$ refers to the geographic distance between two pixels, x1, x0, y1, y0 refer to coordinates of the two pixels on x axis and y axis respectively, Ψ refers to weighting parameter for the geographic distance and also for incorporating normalization factors, Dst refer to combined distance between the two pixels that is sum of the color distance $Dst_{nm1}$ and the geographic distance $Dst_{xy}$.

Please be noted that the example as illustrated above is only as an example. Designers may adjust the function during implementation and all variation under the same spirit should be regarded within the scope of the present invention.

Please be also noted that multiple images for a category may be used as input for perform optimization for the weighting values α, β, γ, φ. For example, a series of sample images that are taken from outdoor scenes under sunshine are input for experiment. During the experiment, it is found that β and γ, which respectively associate to norms (of A, B) and luminance values (L), play important roles for obtaining optimized result on grouping pixels into super pixels. There are several methods for performing such optimization. For example, φ is firstly optimized when α, β, γ keep fixed. Then, α, β, γ may be optimized one after another. In the real example, φ is found 0.9~1, a is found 0.1, β is found 0.8, and γ is found 0.4 to reach well super pixel grouping statistically.

Instead of the angles in (A, B) sub-space, the norms and the luminance values are found more important in determining whether two pixels are similar and should be grouped together in one super pixel for images taken under strong sun light. For sunset scenes, because the light characteristic may vary, the optimized weighting parameters may need to adjust to get best super pixels. As mentioned above, accuracy of super pixel helps a lot for continued processing, e.g. clustering of super pixels.

Please be also noted that it is also finds that after the super pixels are determined under the optimized parameters, the polar angles of (A, B) may play more important role for clustering super pixels into bigger blocks. Because such processing may take multiple iterations, different weighting parameters for determining a difference level between two pixel sets may be changed under training of certain number of sample images.

In addition, other types of scenes may be optimized under the same logic and processing to find corresponding optimized parameters of α, β, γ and φ. After that, for grouping super pixels in an image, the image may be determined its type with any method, and the corresponding parameters may be applied to calculate the color distance and the geographic distance as basis for grouping the pixels of the image into super pixels.

Figure 13:
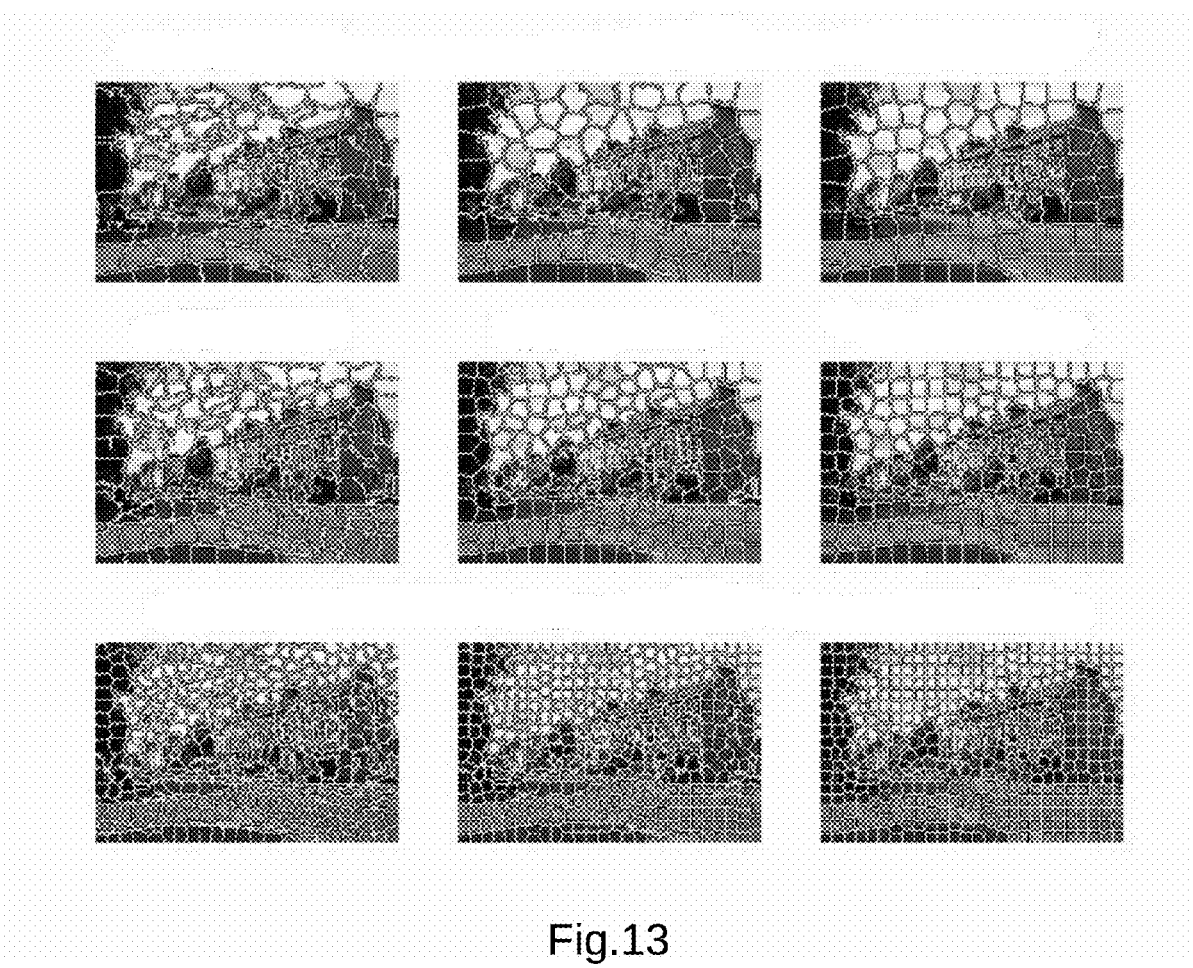
FIG. 13 illustrates the size and shape of super pixels may vary under different parameters.

In addition, other parameters used in grouping super pixels may be adjusted. FIG. 13 illustrates different results of super pixel grouping by changing different parameters. While super pixel processing helps decrease computation complexity, accuracy of super pixel may affect processing of later stage. Therefore, it is important to find an optimized parameter set to calculate super pixels. There are different ways to achieve this objective. For example, images may be classified into several types. For each type of images, best super pixel grouping for sample images may be designated by human, and different parameter set are supplied to find an optimized parameter set. Machine learning like SVM (Support Vector Machine) or neural networks may be applied on such learning to automatically establish a parameter database that can be used in real work.

Figure 14A:
FIG. 14A, FIG. 14B, FIG. 14C and FIG. 14D illustrate a raw image, recognized result by human, grouped super pixels and clustered pixel sets after computation.
Figure 14B:
Figure 14C:
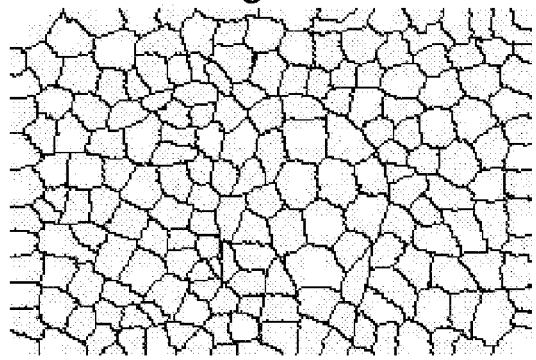
Figure 14D:
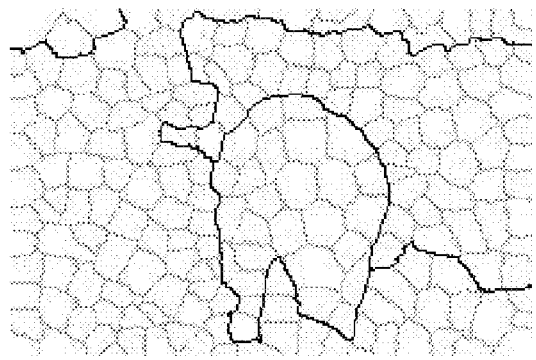

FIG. 14A, FIG. 14B, FIG. 14C and FIG. 14D illustrate an example in different processing stages. FIG. 14A illustrate an input image, in which a bear is standing along a riverside. FIG. 14B is a recognition result by human eyes on the same image. The bear, the river and the riverside are recognized in three pixel sets. Machine like computers do not have human intelligence and corresponding skills and processing need to be used to achieve machine recognition. As mentioned above, an image is composed of pixels and the large number of pixels usually causes computation difficulties. Therefore, the pixels, during machine processing, are grouped into super pixels as illustrated in FIG. 14C with methods as mentioned above. The next step to perform machine recognition on the image is to further classify and group the super pixels into clusters.

Various methods may be applied to further group the super pixels into clusters. For example, Laplacian matrix may be used with different criteria like Min-cut criteria, Ratio-cut criteria, Normalized-cut criteria to transform high dimension space into low dimension space. A clustering example that uses Bhattacharyya parameter is provided as follows. The detailed method of Bhattacharyya can be found in "Kernel-based object tracking" on Pattern Analysis and Machine Intelligence, IEEE Transactions on 2003, 25(5): 564-577 of Comaniciu D et al.

First step, the aforementioned super pixels are assigned as vertices of a non-direction weighting graph G(V, W), where V={v1, v2, v3, . . . , vn} refer to the super pixel set.

Second step, construct adjacent matrix E, i=1, 2, . . . , n; j=1, 2, . . . n where n is the number of super pixels. $E_{i,j}=1$ if super pixel i is adjacent to super pixel j and $E_{i,j}=0$ if super pixel i is not adjacent to super pixel j.

Third step, construct weighting adjacent matrix W, i=1, 2, . . . , n; j=1, 2, . . . n where n is the number of super pixels.

$$W_{ij}=W(i,j) \text{ if } E_{i,j}=1 \text{ and } W_{ij}=0 \text{ if } E_{i,j}=0$$

The W(i, j) is a metric of Bhattacharyya parameter of normalized CIELAB color histogram between two adjacent super pixels. Specifically, the image is converted to CIELAB color space. The L channel is divided into 8 scales, A channel is divided into 16 scales, and B channel is divided into 16 scales. The reason to divide the L channel into only 8 scales is to decrease disturbance of luminance changes. Each super pixel in the space of 8×16×16=2048 dimension has histogram as:

$$H(i)=(\sqrt{h_1(i)}, \sqrt{h_2(i)} \ldots \sqrt{h_i(i)}), \text{ where } i=2048 \text{ and when } E_{i,j}=1,$$

$$W(i,j) = \frac{H(i) \cdot H(j)}{|H(i)| \cdot |H(j)|} = \sum_{u=1}^{l} \frac{\sqrt{h_u(i) h_u(j)}}{\sqrt{\sum_{u=1}^{l} h_u(i) \sum_{u=1}^{l} h_u(j)}}$$

In addition, two conditions based on color distance and texture energy distance are added on calculating W(i, j).

For the first condition, when W(i, j)≤0.71≈cos 45°, W(i, j)=0. This condition helps increase similarity threshold between adjacent super pixel color to increase robust of the clustering.

For the second condition, four-dimension wavelet feature vector of each super pixel is calculated as (i)=($e_{i(LL)}$, $e_{i(LH)}$, $e_{i(HL)}$, $e_{i(HH)}$), and the Bhattacharyya parameter of adjacent super pixels is:

$$B_e(i,j) = \frac{e(i) \cdot e(j)}{|e(i)| \cdot |e(j)|}$$

$$|e(i)| = \sqrt{e_{i(LL)}^2 + e_{i(LH)}^2 + e_{i(HL)}^2 + e_{i(HH)}^2}$$

where,

The calculation of ($e_{i(LL)}$, $e_{i(LH)}$, $e_{i(HL)}$, $e_{i(HH)}$) are obtained as follows:

$$e_{i(LL)} = \sqrt{\frac{1}{N_p} \sum_{i=r_b}^{r_t} \sum_{j=c_l}^{c_r} R_{(LL)}^2(i,j)}$$

$$e_{i(LH)} = \sqrt{\frac{1}{N_p} \sum_{i=r_b}^{r_t} \sum_{j=c_l}^{c_r} R_{(LH)}^2(i,j)}$$

$$e_{i(HL)} = \sqrt{\frac{1}{N_p} \sum_{i=r_b}^{r_t} \sum_{j=c_l}^{c_r} R_{(HL)}^2(i,j)}$$

$$e_{i(HH)} = \sqrt{\frac{1}{N_p} \sum_{i=r_b}^{r_t} \sum_{j=c_l}^{c_r} R_{(HH)}^2(i,j)}$$

in which, $N_p$ is the pixel number of the pixel cluster, $r_b$ is the bottom of the pixel cluster, $r_t$ is the top of the pixel cluster, $c_l$ is the left corner of i-th row and $c_r$ is the right corner of the i-th row. The values of $R_{(LL)}(i,j)$, $R_{(LH)}(i,j)$, $R_{(HL)}(i,j)$, $R_{(HH)}(i,j)$ are the single layer wavelet sampling value at point (I,j). Please be noted that when calculating average energy metric for each super pixel, the fake energy from irregular edges need to be canceled.

When $B_e(i,j) \leq 0.95 \approx \cos 20°$, $W(i,j)=0$.

The above condition helps increase similarity texture threshold of adjacent super pixels to protect boundary features between the sky objects and vertical objects, and between the vertical objects and the ground objects in the image.

Fourth step, construct distance metric D, where i=1, 2, . . . n; j=1, 2, . . . , n:

$$D = \begin{cases} d_{ii} = \sum_{j=1}^{n} W(i,j) \\ 0 \quad \text{others} \end{cases}$$

Fifth, construct normalized Laplacian matric, where normalized-cut criteria is used:

$$L = I - D^{-1/2} W D^{-1/2}$$

Sixth step, decompose $L_{sym}$ and takes the K-th smallest eigenvectors $V_1, V_2, V_3, \ldots, V_k$, where K=[0.1×n], which means 10% of n is taken as the dimension of the cluster dimension to decrease dimension of super pixels down to 10%.

Seventh step, arrange $V_1, V_2, V_3, \ldots, V_k$ as a $R^{n \times k}$ matrix and gets absolute value for each element to get the matrix U.

Eighth step, assign $y_i \in R^k$ as the i-th row vector of the matrix U, where i=1, 2, 3, . . . , n.

Ninth step, normalize non-zero $y_i \in R^k$ vectors to 1, and use Bhattacharyya parameter method to cluster, where the BU threshold of Bhattacharyya distance is cos 20°≈0.95, which means when BU≥0.95, super pixels are clustered.

Tenth step, apply normalized CIELAB color histogram on each pixel cluster and calculate Bhattacharyya distance W(i,j) for adjacent super pixel and calculate $B_e(i,j)$ of adjacent super pixel. When w(i,j)≥0.90 and $B_e(i,j)$≥0.8, clustering is performed.

The processing steps from the first step to the tenth step are repeated until convergence.

In the present invention, an effective method is found to distinguish super pixels, pixel cluster or pixel set of sky objects from architecture objects or other vertical objects in an image. Air with low density like sky and cloud are distributed above and form the sky object. Compared with sky objects, vertical objects appear quite differently under light reflection and shows different texture energy characteristics in an image.

As mentioned above, super pixel or other pixel set may be performed with single layer wavelet transformation to obtain wavelet vectors of $e_{i(LL)}$, $e_{i(LH)}$, $e_{i(HL)}$, $e_{i(HH)}$. The vector $e_{LL}$ indicates overall brightness of a super pixel and $e_{LH}$, $e_{HL}$, $e_{HH}$ indicate high frequency texture information.

FIG. 15 illustrates wavelet vectors for objects in real image examples. From FIG. 15, it is clearly found that sky object like air has relatively large $e_{LL}$ compared with other three components $e_{LH}$, $e_{HL}$ and $e_{HH}$. This finding is very helpful on distinguishing a super pixel or a pixel cluster of sky objects from other vertical objects like buildings.

Figure 16:
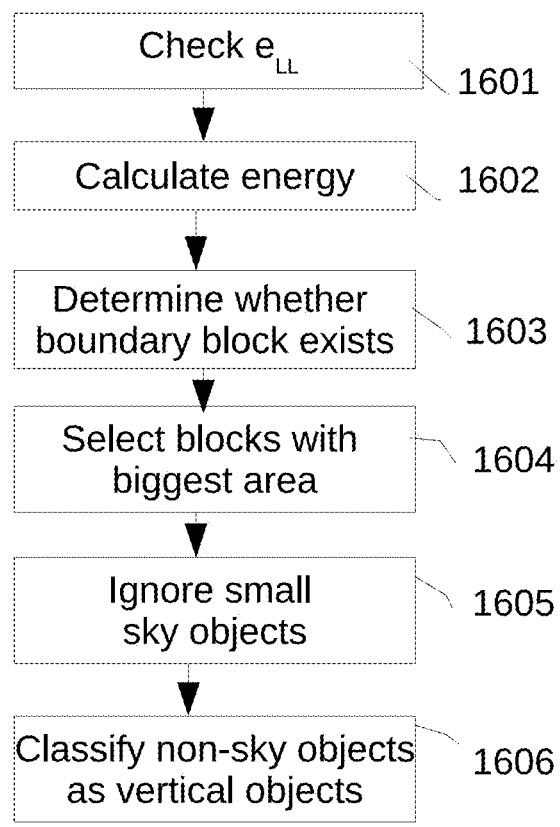
FIG. 16 is a flow chart illustrating how to distinguish a sky object from other types via wavelet transformation and related machine learning.

FIG. 16 is a flowchart illustrating using such finding to construct a method for distinguishing a super pixel or a pixel cluster of sky objects from other vertical objects like buildings. In the following description, the term pixel block is referred to a super pixel, a pixel cluster or any other pixel set.

First, $e_{LL}$ of a pixel block is compared with average $e_{LL}$ of other pixel blocks in an image (step 1601). If $e_{LL}$ is larger than average $e_{LL}$ of other pixels in the image, the image block is chosen as a candidate sky pixel block.

Second, use the average wavelet energy as indictor for texture energy feature (step 1602). When $E^* = \sqrt{e^2_{LH} + e^2_{HL} + e_2^{HH}} \leq E_c$, the associated candidate sky pixel block satisfying the condition of the first step is chosen as a candidate sky pixel block. $E_c$ is a predetermined value.

Third, it is checked whether any pixel block extends to the upper boundary of the image (step 1603). If so, the image is determined having sky objects. Otherwise, the image is determined having no sky object. For images of sky surrounded by vertical objects like buildings, like a sky via a window, such images are determined having no sky objects.

Fourth, If there are more than one candidate sky pixel blocks, choose the pixel block having the maximum area. Color distance $d_{ab}$ and luminance distance di, are used for clustering pixel blocks of sky objects with the following formula:

$$d_{ab} = \sqrt{(a_s-a_i)^2 + (b_s-b_i)^2} \leq C \; Id_L = (L_s - L_i)^2 \times L$$

where $a_s$, $b_s$ are average values of sky pixel blocks under CIELAB color space, $a_i$, $b_i$ are average values of sky candidate pixel blocks under CIELAB color space. When $d_{ab} \leq C$ and $d_L \leq L$, the associated pixel block is determined as a sky object, and otherwise determined as a vertical object. C and L are predetermined values chosen from experiments.

Fifth, if the clustering area is less than 2% area of the whole image, the sky object is ignored (step 1605), because under such circumstances, sky object usually does not matter a lot.

Sixth, classify all non-sky pixel blocks as vertical object pixel blocks (step 1606).

In addition to distinguish pixel blocks of sky objects from vertical objects, it is also important to distinguish pixel blocks of architecture objects from plant objects. It is important in the present invention to find that architecture objects have different line segment distribution from plant objects.

Figure 17A:
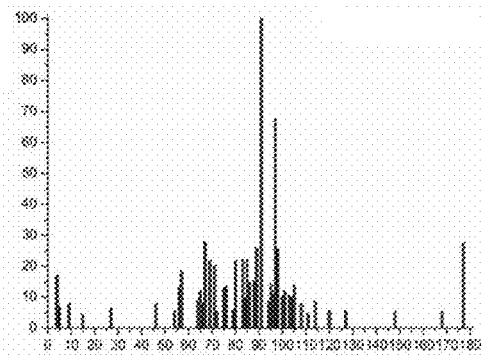
FIGS. 17A, 17B, 17C and 17D are a histograms illustrating line segment distribution in different directions that can be used for distinguish an architecture object from a natural plant object.
Figure 17B:
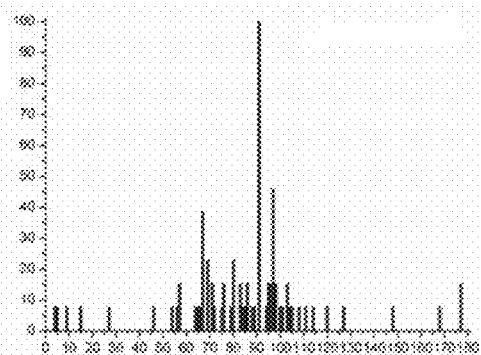
Figure 17C:
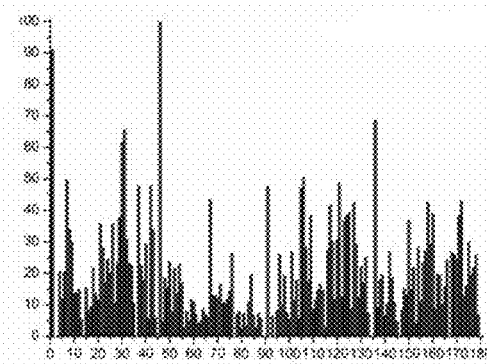
Figure 17D:
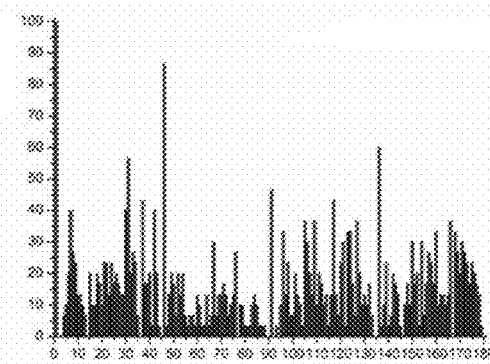

FIG. 17A and FIG. 17B are associated with line segment distribution for architecture pixel blocks. FIG. 17C and FIG. 17D are associated with line segment distribution for plant pixel blocks. The X-axis of FIG. 17A and FIG. 17C represents directions of line segments and Y-axis of FIG. 17A and FIG. 17C represents accumulated lengths of line segments on different directions. The X-axis of FIG. 17B and FIG. 17D represents directions of line segments and Y-axis of FIG. 17B and FIG. 17D represents accumulated number of line segments on different directions. In other words, the number and accumulated lengths of line segment distribution are considered and it is clear to find that pixel blocks of plant objects and pixel blocks of architecture objects have quite different line segment distribution characteristics over direction. This characteristic is resulted from that plant objects like trees usually have line segments on random directions. In contrast, architecture objects usually have line segments more concentrated on certain directions.

Figure 18:
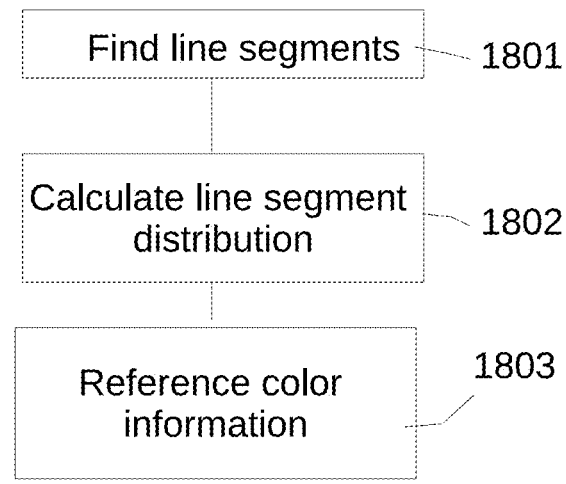
FIG. 18 is a flowchart illustrating how to calculate and use the histogram of FIG. 17.

FIG. 18 is a flowchart illustrating a method for distinguishing pixel blocks of plant objects from architecture objects.

First, line segments are extracted from pixel blocks (step 1801). The line segment refers to line formed by pixels on which high frequency exists, by which it usually indicates apparent boundaries. Such line segments may be extracted by various known methods like frequency analysis.

Second, line segments distribution is calculated (step 1802). This may include histogram generation for line segments lying on different directions, including number and/or accumulated lengths.

Third, color of a pixel block may also provide helpful information for distinguishing pixel blocks of architecture objects from plant objects (step 1803). As mentioned above, under various light and shadow interference, it is found that distance over visible spectrum like polar angle difference over CIELAB is helpful on distinguishing objects in an image. The average color values of a pixel block is calculated and compared with reference color values pre-stored in a database to determine whether a pixel block is a plant object or not.

It is also important to check whether an image contains an architecture object in near distance, which means whether an architecture object occupy a major portion of an image. Such situation is a major cause of recognition error when such situation is not identified properly.

Figure 19:
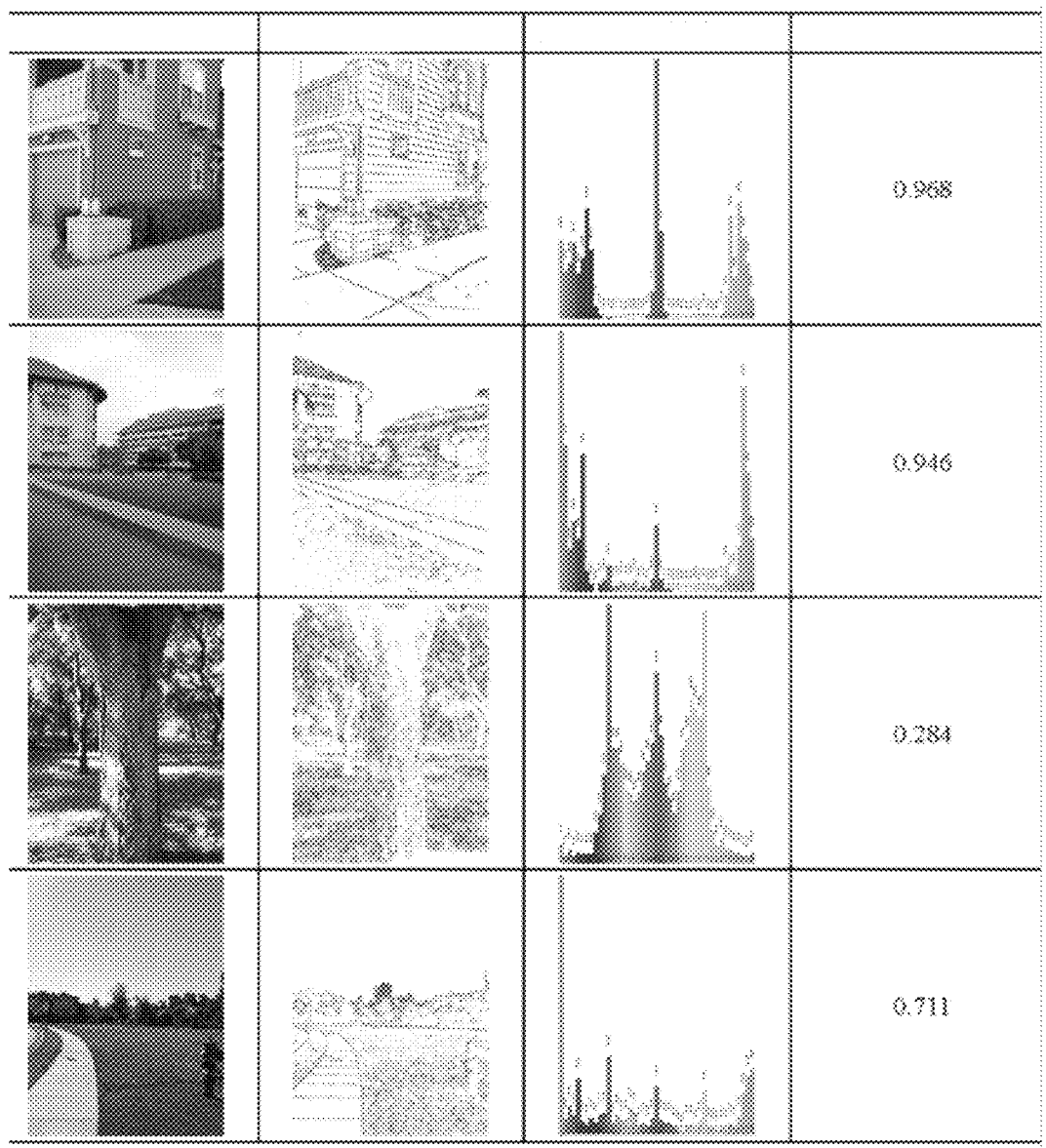
FIG. 19 illustrates line segment distributions for different types of images.

Therefore, it is also important in the present invention to find a method for identifying whether a near architecture exists. In FIG. 19, line segment distribution over different directions for different types of images is presented. It is clearly found that if a near architecture exists, there is an apparent peak on certain direction just like the top image in FIG. 19.

Figure 20:
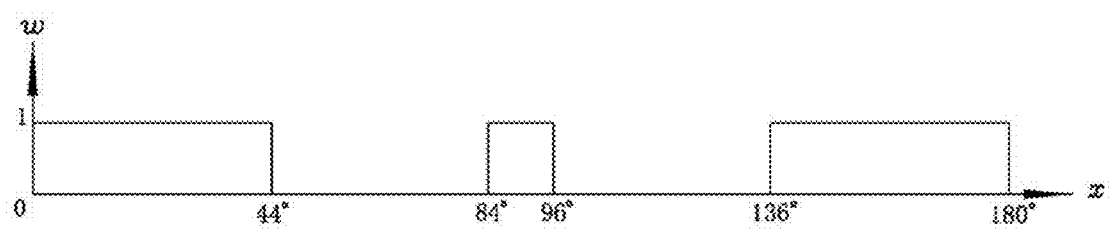
FIG. 20 is a window function for filtering required data to determine whether there is a near architecture existed in the image.

To find out whether such peak pattern exists, a window function as illustrated in FIG. 20 may be applied. As mentioned above, the issue to identify whether a near architecture exists depends on finding whether line segments have peak in certain direction range. In the window function of FIG. 20, the direction ranges of 0-44 degree, 84-96 degree and 136-180 degree have positive value of 1 while direction ranges in other directions remain 0. In other words, when a histogram of line segment distribution over direction is multiplied to such window function, the multiplied result indicates important information for solving the problem at matter.

Figure 21:
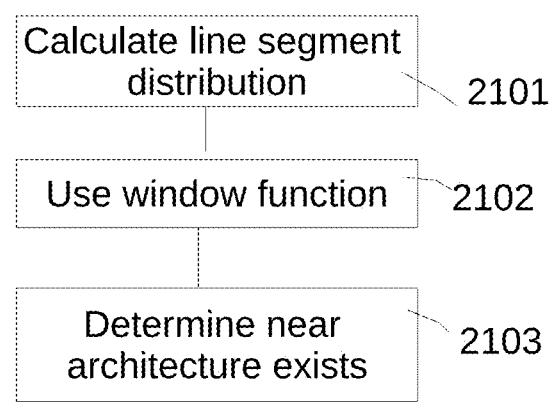
FIG. 21 is flowchart illustrating how to calculate and use the window function of FIG. 19 and FIG. 20 to specify objects in an image.

FIG. 21 is a flowchart illustrating how to identify whether a near architecture occupy a major area of an image. First, line segment distribution over direction is calculated, e.g. histogram of line segments over direction is generated (step 2101).

Next, the window function like the one illustrated in FIG. 20 is used for extracting and calculating energy of line segments on certain direction ranges (step 2102). The calculated energy may be further normalized to adapt for various situations.

Figure 22:
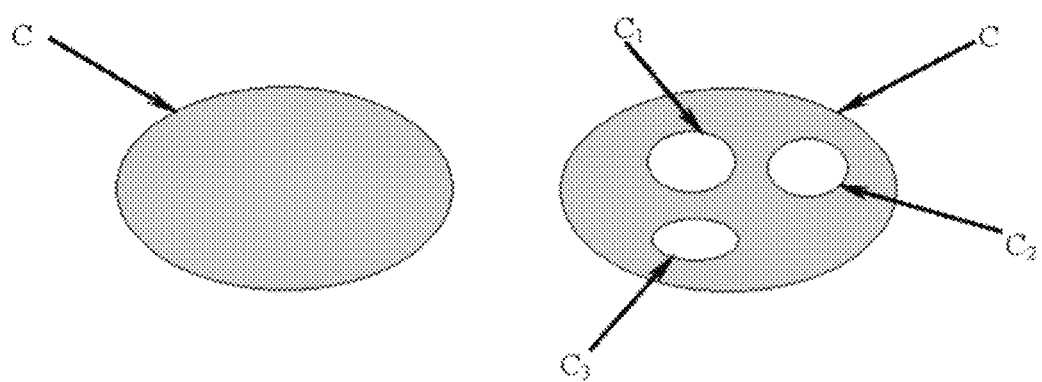
FIG. 22 illustrates how to eliminate shapes enclosed by other shapes.

Third, the calculation result is used for identifying whether a near architecture exists (step 2103) and chooses a corresponding approach for handling such situation It is also important to eliminate certain information to increase machine recognition efficiency and accuracy. FIG. 22 illustrates the situation that a shape encloses inner shapes. In FIG. 22, the shape C contains inner shapes C1, C2 and C3. Sometimes, C1, C2 and C3 may provide important information. However, when the major requirement is to categorize objects in an image into only three types, e.g. sky objects, vertical objects and ground objects, it is better to ignore such inner shapes C1, C2 and C3 and only use information of C to perform related computation for machine recognition.

Figure 23:
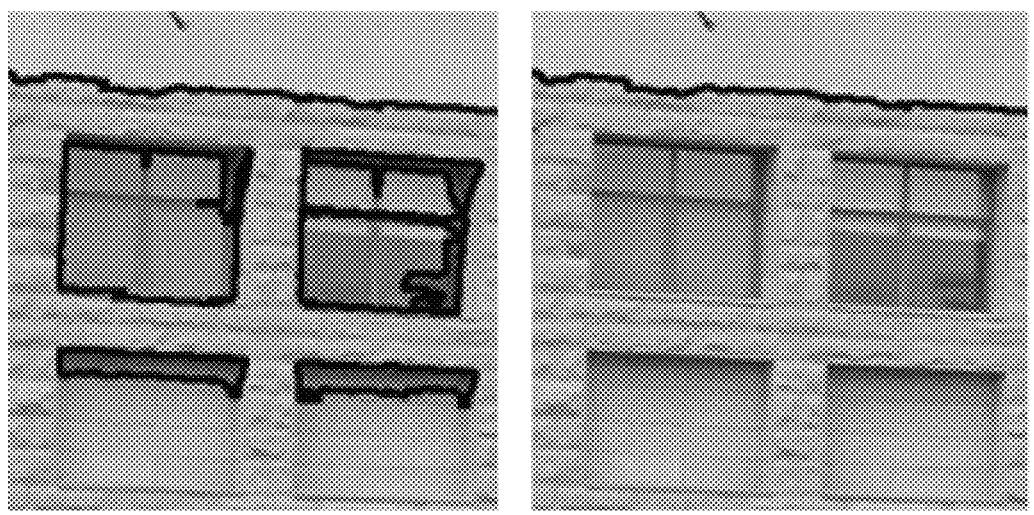
FIG. 23 is an example of FIG. 22.

FIG. 23 illustrates inner shapes enclosed by other shapes in a real example. In the left side of FIG. 23, a window object is identified and regarded as a pixel block. In some aspect, the window object is enclosed by a building object. In the right side of FIG. 23, although the information of the window object is absorbed in the building object, the overall information has less noises and is actually more useful. Please be noted eliminating such isolated objects helps decrease odd cases in the recognition algorithm of gravity-like distribution function described later in this description.

Figure 24:
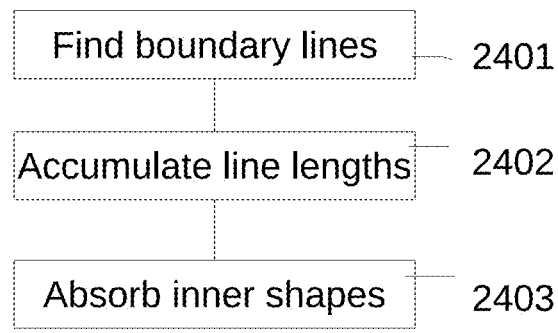
FIG. 24 illustrates a flowchart for eliminating shapes enclosed by other shapes.

FIG. 24 illustrates a method for absorbing inner shapes with a shape enclosing the inner shapes. First, boundary lines are identified (step 2401) by finding line segments using methods like frequency analysis. Then, the lengths of all line segments are accumulated (step 2402). If the lengths of all line segments equals or close to the outer boundary of the shape, the shape is determined having no inner shapes. Otherwise, line segments in inner shapes are eliminated to absorb associated inner shapes with its outer shape.

Figure 25:
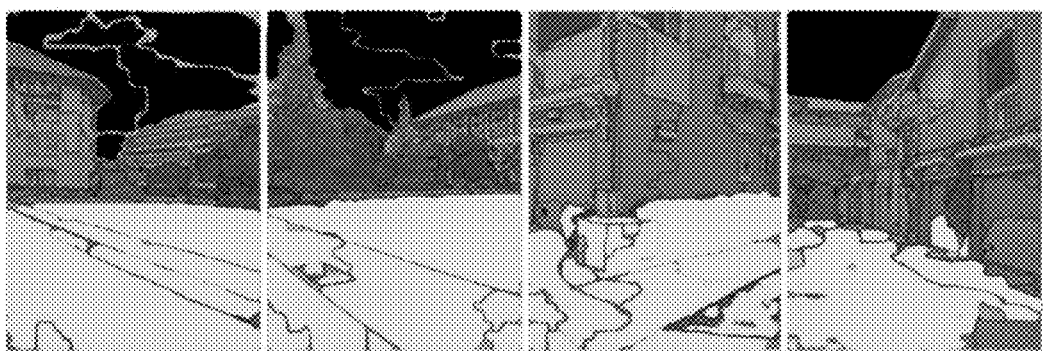
FIG. 25 illustrates a process output after preliminary processing.

FIG. 25 illustrates some real experiment results by using the methods of super pixel grouping, clustering, architecture ad sky and other objet distinguishing, identifying near architecture and inner shape elimination. Very well result are obtained on different images of various outdoor scenes. The image is partitioned into the sky objects, the vertical objects and the ground objects.

Figure 26:
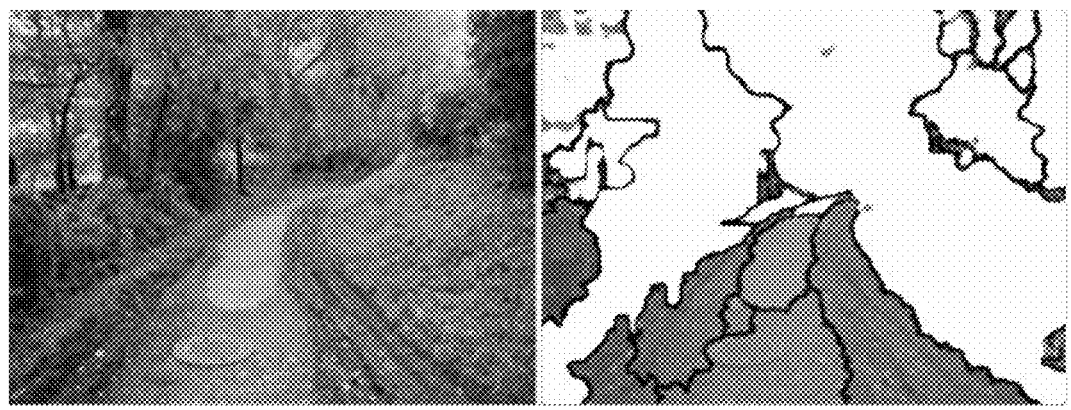
FIG. 26 illustrates an incorrectly specified object existed in an image.

Although the above mentioned methods have provided very well performance of machine recognition, there are cases with mistakes because variety of images. For example, in the left side of FIG. 26, it shows a road in a forest and the in the right side of FIG. 26, it shows that under super pixel grouping and clustering, some trees are mistaken classified into sky objects instead of vertical objects. The following method for images taken in gravity-like environments may help further improve machine recognition.

Figure 27:
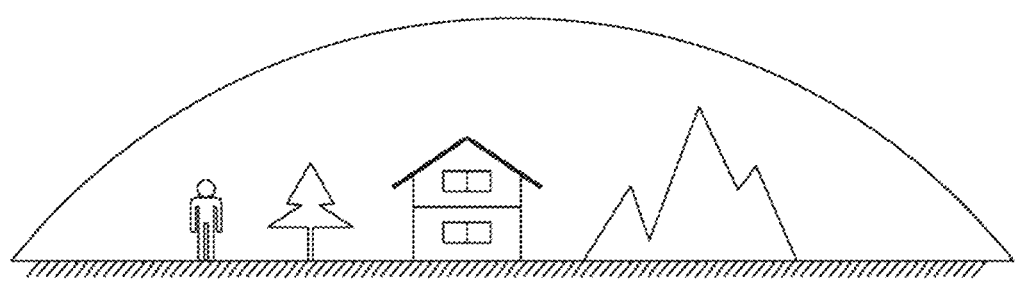
FIG. 27 illustrates a viewpoint by human for recognition as a basis for developing gravity-like recognition for machine vision.

The method is found by observing how human recognize the world. In FIG. 27, a person, trees, building and mountains are standing above ground and covered by sky. Because the earth is very large compared with the objects thereon, the ground is basically perceived as a flat surface instead of a curve surface. Due to gravity, most things, instead of cloud or other sky objects, stand upon and above ground and under the sky.

Figure 28:
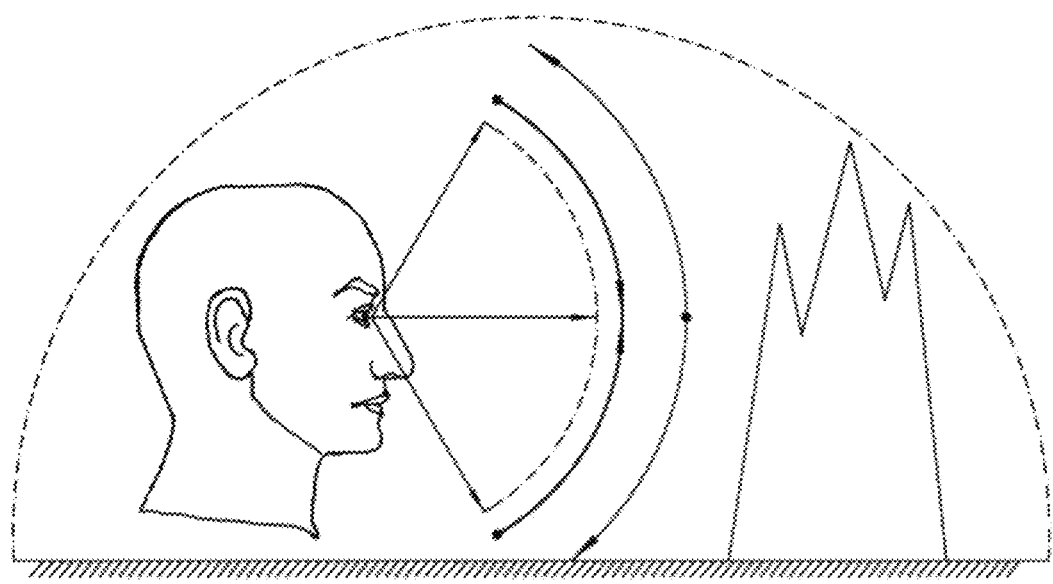
FIG. 28 illustrates distribution function for sky objects, ground objects and vertical objects.

In other words, sky objects seldom appear on bottom of images and ground objects seldom appear on top of images. On the other hands, objects usually appear in the middle of view line and appear less in the top and the bottom of the image. FIG. 28 illustrates such relation. Under accumulated experience, human tends to find vertical objects in the horizon line of vision and guess the sky on the top portion while the ground on the bottom portion.

This finding is very helpful on constructing a method for categorizing objects in an image to three categories, i.e. the sky objects, the vertical objects and the ground objects. As mentioned above, the three categories of objects have different distribution probability in different area of an image.

Specifically, the sky objects have the largest probability appearing on top of the image and such probability decreases downwardly. The ground objects have the largest probabilities appearing on bottom of the image and such probability decreases upwardly. The vertical objects have the largest probabilities appearing in the center line of vision and the probability decreases both upwardly and downwardly in the image.

Figure 29:
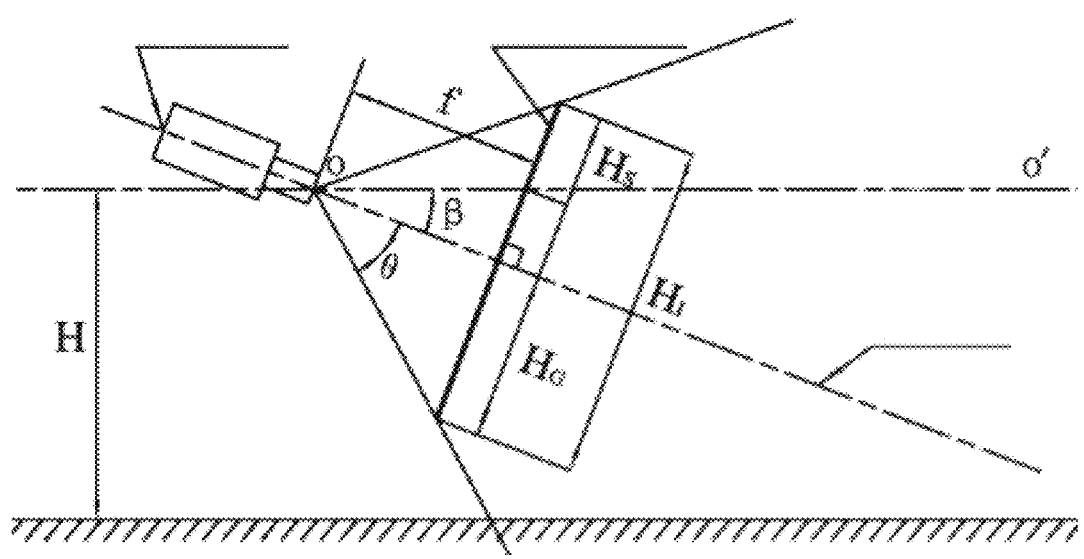
FIG. 29 illustrates how view angle changes affect distribution functions.

FIG. 29 shows a horizon line of vision changes when the camera uses to capture the image is tilt for certain angles. In some cases, it is not able to know what view angle is used by a camera to capture an image, but in some other cases, it is possible to get the view angle values. With such information, it is able to adjust the probability distribution of the vertical objects, the sky objects and the ground objects. The vision horizon line is a well-known concept in painting related to vanishing points in horizon, i.e. with two reference vanishing points which converge and define a horizontal line. The vision horizon line is usually not appearing directly in an image or a painting, but the vision horizon line is a critical reference line when human perceive objects in a gravity-like environment. By identifying the vision horizon line by sensors or by analyzing, the present invention achieves very well performance with associated distribution functions according to the vision horizon line.

Figure 30:
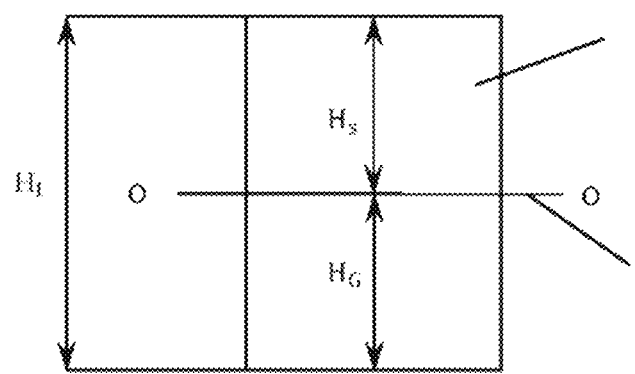
FIG. 30 illustrates how distribution function for sky objects, ground objects and vertical objects are constructed.

FIG. 30 illustrates the horizon line of vision OO'. Hs indicates the major portion for sky objects in an image. In one preferred embodiment, the probability of sky object to appear in the horizon line of vision OO' is zero and down to even negative values below the horizon line of vision OO'. HG indicates the major range for ground objects to appear in an image. Similarly, the probability of ground object to appear in the horizon line of vision OO' is zero and down to even negative values above the horizon line of vision OO'. Hi indicates the major range for vertical objects to appear in an image. The maximum probability is at the horizon line of vision OO'.

In a preferred embodiment, the distribution function of ground objects by reference to FIG. 30 may be defined as follows:

When $H_G \geq H_S$, $G(x) = C_G x^{\frac{1}{2n+1}}$ and $$\int_{-H_G}^{0} G(x)dx = 1, C_G = -\left(\frac{2n+2}{2n+1}\right) H_G^{-\frac{2n+2}{2n+1}}$$

When $H_G < H_S$, $G(x) = -S(x)$.

i.e., $G(x) = \begin{cases} C_G x^{\frac{1}{2n+1}} & \text{when } H_G \geq H_S \\ -S(x) & \text{when } H_G < H_S \end{cases}$ Where n=1, 2, 3, . . . , N and N is a positive integer.

The distribution function of sky objects by reference to FIG. 30 may be defined as follows:

When $H_G < H_S$, $S(x) = C_S x^{\frac{1}{2n+1}}$ and $C_S = \left(\frac{2n+2}{2n+1}\right) H_S^{-\frac{2n+2}{2n+1}}$, $$C_S = \left(\frac{2n+2}{2n+1}\right) H_S^{-\frac{2n+2}{2n+1}}$$

When $H_G \geq H_S$, $S(x) = -G(x)$, $S(x) = \begin{cases} C_S x^{\frac{1}{2n+1}} & \text{when } H_G < H_S \\ -G(x) & \text{when } H_G \geq H_S \end{cases}$ where n=1, 2, 3, . . . , N and N is a positive integer.

The distribution function for vertical objects is defined as follows:

$$V(x) = \frac{1}{\sqrt{2\pi}\,\sigma} e^{-\frac{x^2}{\sigma^2}} \text{ where } \begin{cases} \sigma = \frac{H_G}{3} & \text{when } H_G \geq H_S \\ \sigma = \frac{H_S}{3} & \text{when } H_G < H_S \end{cases}$$

When the distribution functions for vertical objects, the ground objects and the sky objects are defined, pixels for the pixel blocks are multiplied by the distribution function of the sky objects, the ground objects and vertical objects to get expected values as follows:

$$G_E = \sum_{i=r_b}^{r_t} n_i G(i - H_G)$$

$$S_E = \sum_{i=r_b}^{r_t} n_i S(i - H_G)$$

$$V_E = \sum_{i=r_b}^{r_t} n_i V(i - H_G)$$

where $n_i$ is the pixel number of a pixel block in i-th row of an image, $r_b$ is the bottom of the image and the $r_t$ is the top of the image. With the expected values for each pixel block, the pixel blocks in an image are respectfully labeled as sky objects, ground objects or vertical objects with following function:

$$Label = \begin{cases} S & when \quad Max(G_E, S_E, V_E) = S_E \\ V & when \quad Max(G_E, S_E, V_E) = V_E \\ G & when \quad Max(G_E, S_E, V_E) = G_E \end{cases}$$

where S refers to sky objects, V refers to vertical objects and the G refers to ground objects.

Figure 31:
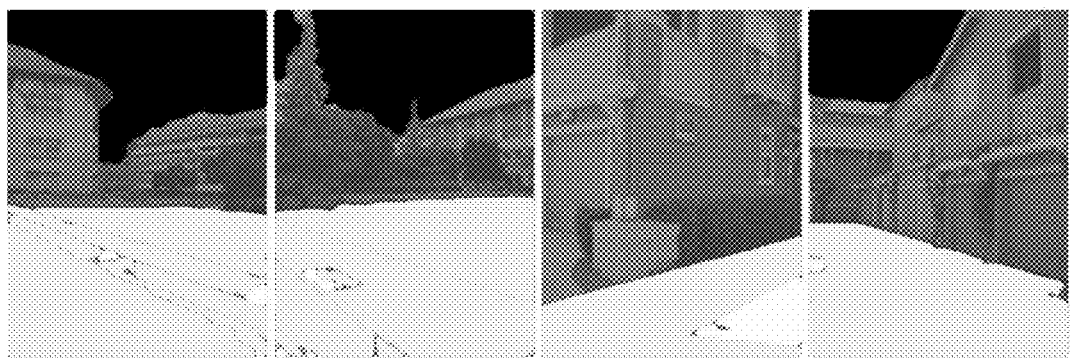
FIG. 31 illustrates a real example recognized by the distribution functions.

With the distribution functions and associated methods as mentioned above, an image particularly captured outdoor can be partitioned into sky objects, ground objects and vertical objects effectively and correctly. FIG. 31 illustrates several real examples portioned into sky objects, ground objects and ground objects.

When the partition of an image is obtained, it is easily to calculate depth information that is important to construct a three-dimension content from a static image. More details may be found in "The linear perspective information in ground surface representation and distance judgment" from Perception & Psychophysics 2007, 69(5): 654-672 by Wu B. et al.

Figure 32A:
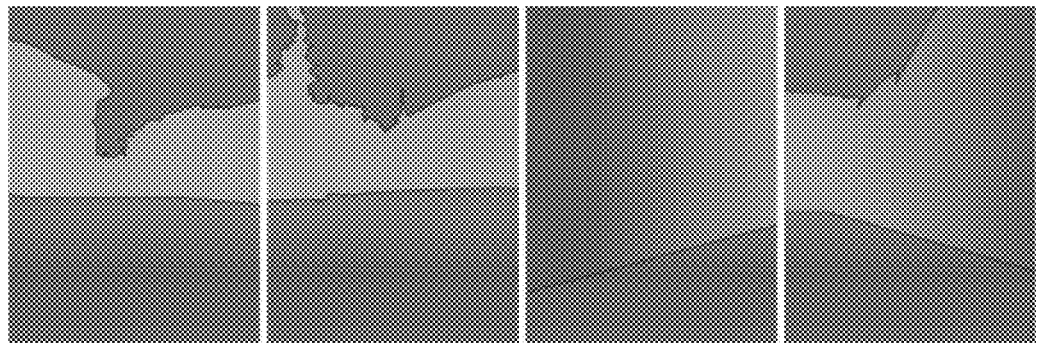
FIG. 32A and FIG. 32B illustrate images with depth information.
Figure 32B:
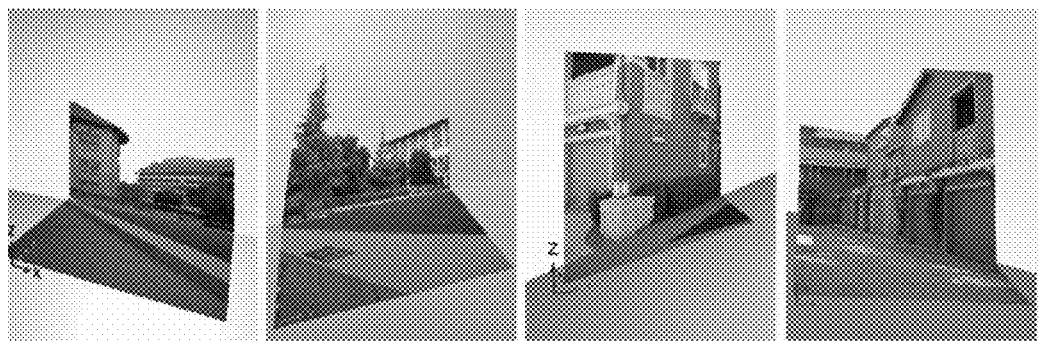

FIG. 32A illustrates a graduation colored image carrying depth information by analyzing color graduation of the original image after the image is partition into the sky object, the ground object and the vertical objects. FIG. 32B illustrates another three dimension construction based on a static two dimension image that is partitioned with the methods as mentioned above.

With such three dimension information, with certain auxiliary information like a laser distance detector, it is possible to calculate distances of many objects in the image by comparing with the pixel at which the laser distance detector emits laser thereon.

Compared with outdoor scene images, it is much more difficult to directly apply the aforementioned method of gravity-like distribution functions for indoor scene images. For indoor scene images, a ceiling replaces the role of sky object in outdoor scene images. Vertical objects like tables or walls lie above the ground and below the ceiling.

Figure 33A:
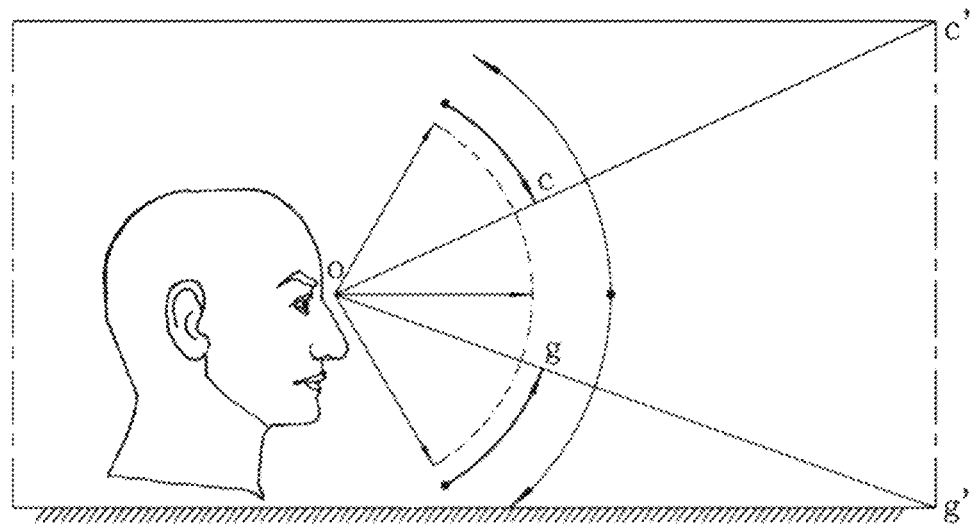
FIG. 33A and FIG. 33B illustrate distribution functions for recognition in an indoor image.
Figure 33B:
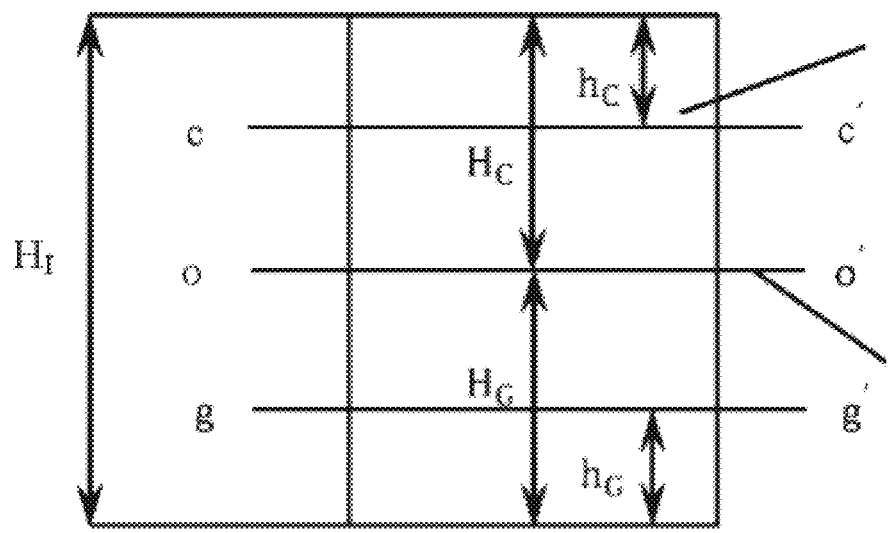

FIG. 33A and FIG. 33B show that the ceiling objects have highest distribution probability that is decreased downwardly to zero to the cc' line that indicates the ceiling vanishing line. Below the cc' line, the distribution probability may even be set as negative values. In addition, the ground objects have highest distribution probability that is decreased downwardly to zero to the gg' line that indicates the ground vanishing line. Above the gg' line, the distribution probability may even be set as negative values. On the other hand, the vertical objects have highest distribution probability on the horizon line of vision oo' and the distribution probability decreases both upwardly and downwardly.

Figure 34:
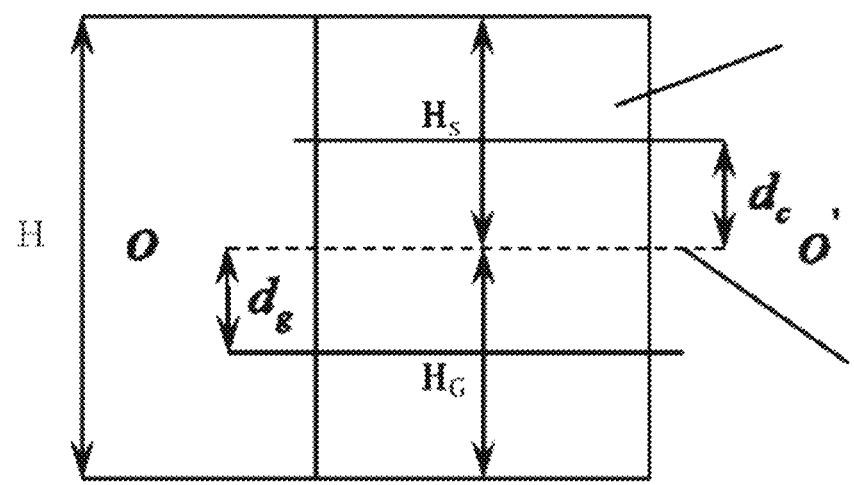
FIG. 34 illustrates estimation of ceiling line and ground line for adjusting the distribution functions of ceiling and ground objects.

It is therefore important to identify an accurate horizon line of vision oo'. A better middle of vision oo' may be found during multiple iterations of adjustment that are explained as follows. As illustrated in FIG. 34, the horizon line oo' is adjusted by finding more and more ceiling objects and ground objects, from which a horizon line of vision for vertical objects can be more accurately obtained.

Figure 35:
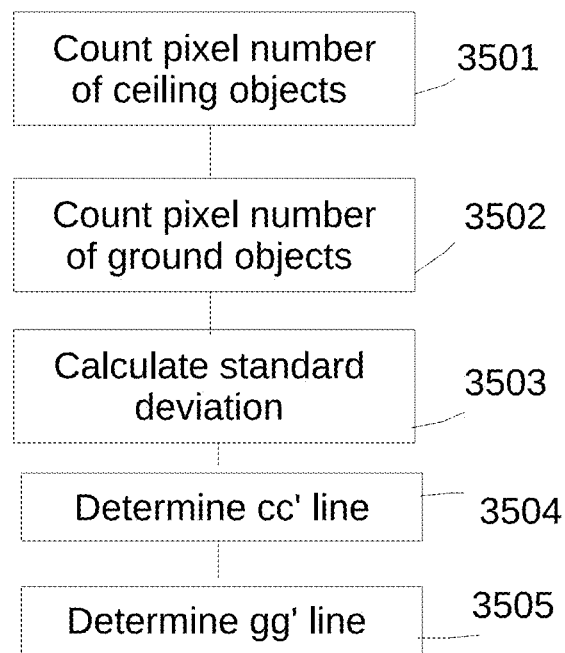
FIG. 35 is a flowchart for calculating the ceiling and ground lines and for performing recognition via the ceiling, vertical object and ground distribution functions.

FIG. 35 is a flowchart for using gravity-like distribution functions to adjust the ceiling line, the ground line and the horizon line of vision.

First, use distribution functions as mentioned above particularly helpful for outdoor scene images to roughly identify pixel blocks as ceiling objects, ground objects and vertical objects. The super pixel grouping and other techniques may also be applied. Then, the pixel number of pixels classified as ceiling objects is counted (step 3501) to get n $L_i^c$, where $L_i^c \neq 0$, i refers to row number of a pixel and c refers to the ceiling pixel.

Also, the pixels number of pixels classified as ground objects is counted (step 3502) to get m $L_j^g$, where $L_j^g \neq 0$, j refers to row number of a pixel and g refers to the ground pixel.

Next, calculate, $\mu_c = max\{L_1^c, L_2^c, \ldots L_n^c\}$ and $\mu_g = max\{L_1^g, L_2^g, \ldots L_m^g\}$. Calculate standard deviation (step 3503) by using $\mu_c$ and $\mu_g$ as average with following functions:

$$S_c = \sqrt{\frac{\sum_{i=1}^{n}(\mu_c - L_i^c)^2}{n}}$$

$$S_g = \sqrt{\frac{\sum_{j=1}^{m}(\mu_g - L_j^g)^2}{m}}$$

Then, construct a new set $\{L_1^c, L_2^c, \ldots L_n^c\}$, by selecting $L_i^c$ larger than $\mu_c - 1.96 S_c$ from $\{L_1^c, L_2^c, \ldots L_n^c\}$ and find a horizon line with minimum distance $d_c$ to the horizon line of vision oo' as the estimated cc' line (step 3504).

In addition, construct a new set $\{L_1^c, L_2^c, \ldots L_n^c\}$ by selecting $L_j^g$ larger than $\mu_g - 1.96 S_g$ from $\{L_1^c, L_2^c, \ldots L_n^c\}$ and find a horizon line with minimum distance $d_g$ to the horizon line of vision oo' as the estimated gg' line (step 3505).

Figure 36:
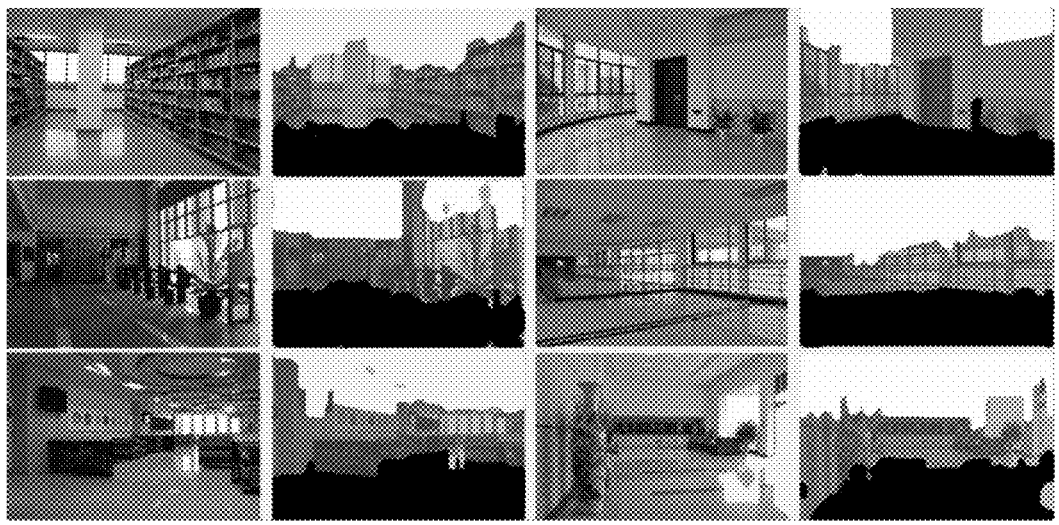
FIG. 36 illustrates experiment effect using the method of FIG. 35.

After multiple iterations, a more accurate partition of an image with indoor scene may be obtained. FIG. 36 illustrates several real examples by using above distribution function to perform partitions of ceiling objects, ground objects and vertical objects.

Besides, under different needs, e.g. computation speed, some calculation and processing may be replaced by other calculation and processing. For example, the Laplacian method for clustering super pixels into larger units provides nice quality but such method involves heavy calculation. For application like autopilot, a faster method would be more proper and beneficial. For example, the following is an alternative method for clustering super pixels into larger pixel sets.

Figure 37:
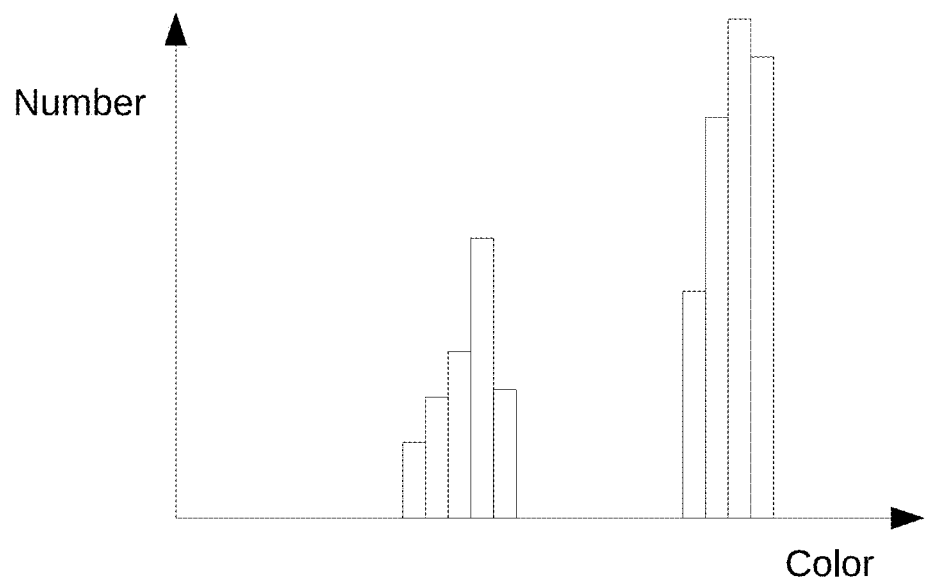
FIG. 37 illustrates a histogram in another embodiment.
Figure 38:
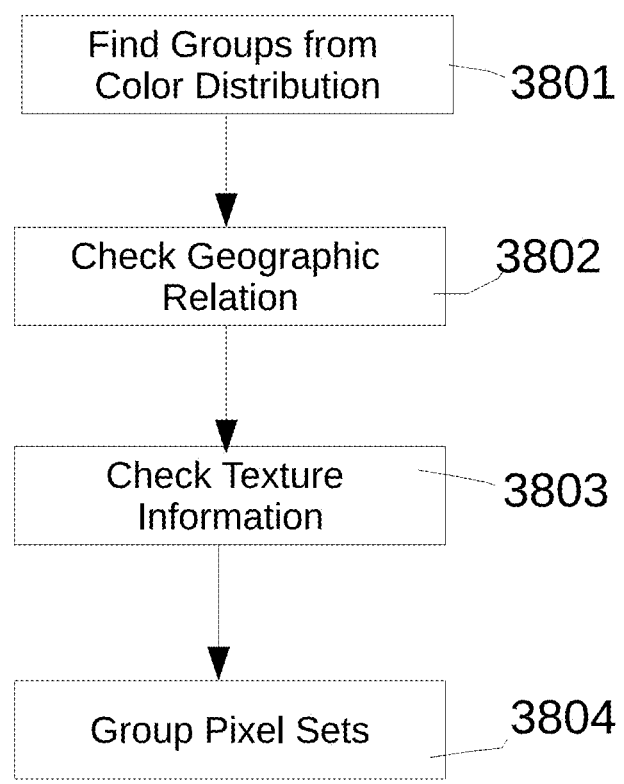
FIG. 38 illustrates a flowchart for another embodiment.

Please refer to FIG. 37 and FIG. 38. Firstly, an image is converted to CIELAB color space or similar color space. Then, super pixel grouping is performed. The average color value of each super pixel is calculated and a histogram like FIG. 37 is generated for showing distribution of super pixels over different color ranges. The average color value may use the aforementioned concept, i.e. the polar angle combined with luminance component under certain circumstances.

Under experiments, super pixels may have several distribution peak in some color ranges. For example, for images taken for desert scenes, blue sky and yellow sand occupy major portion of an image. In such case, super pixels have two distribution peaks on the histogram as illustrated in FIG. 37. In other words, the super pixels may be grouped into two groups (step 3801).

Then, the geographic relation between two super pixels in the same group is checked (step 3802). If two super pixels are found close or even adjacent, the two super pixels are clustered together.

To increase accuracy, texture information of the super pixels to be cluster may also be considered (step 3803). For example, if two super pixels have similar color, close geographic positions, their texture information like wavelet vectors as mentioned above are compared to determine whether to group the two super pixels into a cluster (step 3804).

Figure 39:
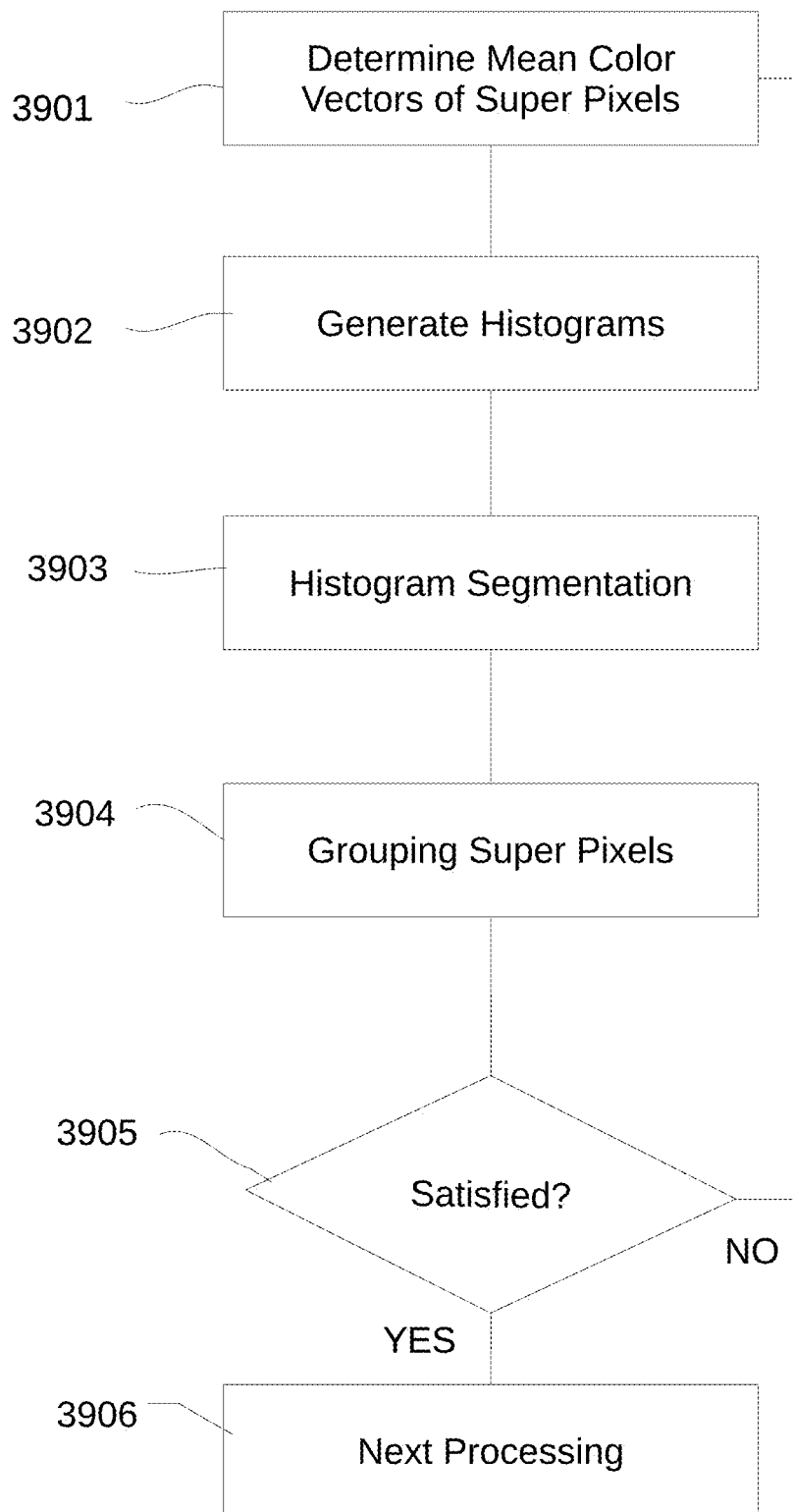
FIG. 39 illustrates a flowchart for yet another embodiment.

Next, please refer to FIG. 39, which illustrates a processing flow for handling clustering of super pixels.

First, an image may be grouped into super pixels as mentioned above. A preferred processing for handling super pixel is to convert pixels in the image into a color space similar to human vision like CIELAB color space. In addition, for projection in (A,B) subspace of a pixel in CIELAB color space is less than a predetermined threshold, L component is preferably taken as a major reference for calculating similarity between the pixel and other pixels for forming super pixels. On the other hand, for projection in (A, B) subspace of a pixel in CIELAB color space is larger than the predetermined threshold, the polar angle of the pixel on the (A, B) subspace in CIELAB is preferably taken as a major reference for calculating similarity between the pixel and other pixels for forming super pixels.

Second, mean values of indicators for each super pixel are calculated (step 3901). For example, if CIELAB color space is used for representing pixels, mean values of (L, A, B) vectors for pixels in each super pixel is calculated. In addition, polar angles of (A, B) vector of projection on (A, B) subspace and norms of (A, B) vectors of projection on (A, B) subspace may also be calculated.

Third, if the mean value of the norm of (A, B) vector for a super pixel is smaller than a threshold, the mean value of the L component is taken as a major reference, and the super pixel and other super pixels with the same condition are counted into a first histogram graph (step 3902). Specifically, the first histogram graph shows distribution of super pixels across different L (luminance component) ranges. For example, L may be divided into 16 or 8 ranges.

On the other hand, if the mean value of the norm of (A, B) vector for a super pixel is larger than the threshold, the mean value of the polar angle of (A, B) vector on the (A, B) subspace is taken as a major reference, and the super pixel and other super pixels with the same condition are counted into a second histogram graph (step 3902). Specifically, the second histogram graph shows distribution of super pixels across different polar angles of (A, B) on the (A, B) subspace ranges. For example, polar angles of (A, B) may be divided into 16 or 8 ranges.

Please be noted that CIELAB is a preferred selection but is not a limitation to the present invention. The polar angles of (A, B) represent corresponding frequencies on visual light spectrum. Any other metrics that can represent such physical features may also be used as an alternative option.

The threshold for the norm of the (A, B) vector represents the purity of a pixel color. The basic principle is that when purity of a pixel color is lower than a level, it is difficult for human to distinguish from one pixel color to another pixel color. When this condition occurs, the luminance component, i.e. the L component in CIELAB color space, is chosen as a major reference for determining similarity between a pixel and other pixels. On the other hand, if the purity of a pixel color is larger than a level, the frequency located in visual spectrum, e.g. red, orange, yellow, green, blue, indigo, violet, which is associated to the polar angle of (A, B) component in (A, B) subspace in CIELAB color space, is chosen as a major reference for determining similarity of a pixel to other pixels.

Because there are various color spaces for defining colors, any other corresponding methods under the same spirit may be used as an alternative option and should be regarded within the scope of the present invention.

When the first histogram and/or the second histogram are obtained, the two histograms are segmented into a predetermined number of segments (step 3903). Specifically, the total range of a histogram, e.g. L or polar angle of (A, B), may be divided into 16 segments. In each segment, the value of L or polar angle of (A, B) corresponding to maximum number of super pixels in each segment is chosen as a middle point and a predetermined offset around the middle point is chosen to form a cluster. For example, if a peak polar angle of (A, B) is 35° and 5° is chosen as an offset value, all super pixels falling within the 30°~40° in the second histogram is taken as a cluster range.

For super pixels in the same cluster range, geographic factor is further taken into consideration. If two super pixels in the same cluster range are adjacent to each other, they are clustered into a bigger super pixel (step 3904). Such calculation may be executed for multiple iterations until convergence or meeting certain predetermined criteria (step 3905). Other processing (step 3906) like machine learning, machine recognition or image processing may be continued based on the clustered result.

Please be noted that the method illustrated in FIG. 39 is suitable to be processed in parallel. Specifically, calculation of histogram and segmentation may be dispatched to different processor cores of a hardware circuit like an accelerated graphical card or other customized integrated chips. Under experiments, this method accompanied with parallel processing provides more than 100 times of performance enhancement.

As mentioned above, after the image is grouped into super pixels, or after the super pixels are further clustered into pixel clusters, when processing dimension is decreased, i.e. the node number to be processed, there are various processing to be combined to form different applications.

For example, the methods for super pixel clustering convert a complicated image quickly into a much less complicated pixel cluster, and under experiments, the pixel cluster keeps even more details particularly when the preferred similarity calculation simulating human vision is adopted. The pixel clusters in an image are better corresponding to physical objects in the real world. For example, an image may contain a flower, a table, a cup and a wall. With the aforementioned methods, it provides an effective way to quickly and accurately extract pixel clusters respectively mapping to the flower, the table, the cup or the wall.

With such feature, the pixel clusters for each type of objects may be extracted for further processing. For example, in image processing software like Adobe Photoshop, it is always a critical issue to select pixels corresponding to a desired object, like a flower or a cup. With the methods of the present invention, users may effectively select different types of objects to be processed, e.g. color adjustment or other filtering processing, for each time.

Sometimes, a meaningful object in real world is composed of several parts. For example, an image of a person is composed of hair, face, clothing, hands and other components. These components usually have certain relation and can be learned by machine like SVM, neural networking techniques or defined by specified rules after certain observation. For example, the probability distributions of a head, clothing, hand and other component may be assigned to different values, just like the vertical objects, sky objects and ground objects as mentioned above. Furthermore, a jacket is usually adjacent to a head and therefore, if two pixel clusters are respectively determined as a head object and a clothing object, the two pixel clusters may be determined corresponding to a person in an image.

This is very helpful on many applications. For example, in the past, a weather reporter stands before a blue or green background when being captured into a first video clip. The first video clip is overlapped to a second video clip to generate a final weather reporting video program. With such method, the weather reporter does not need to stand before a blue or a green background once it is easily to extract the pixel clusters of the weather reporter from a video image and overlaps these pixel clusters into a desired background video clip.

Such application is not limited to an alternative solution for blue screen techniques. For example, in a football game video, when the pixel clusters for each football player may be extracted effectively, accompanied with associated rules, like the football game rules, the football game video may be superimposed with additional information. For example, the strategy of each team in a football game may be analyzed dynamically in real time. Such analysis may be further integrated with prediction as a reference for coaches or those who gamble on the football game. Under the same logic, it can also be used in horse racing games or other games.

Figure 40A:
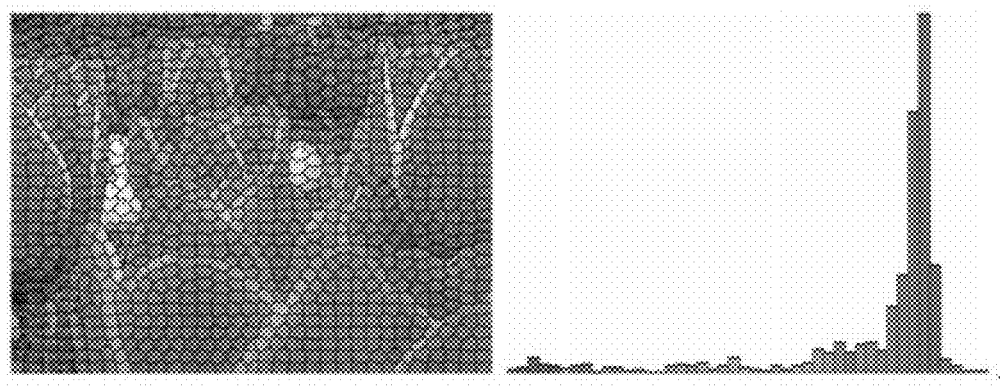
FIG. 40A illustrates a real example under the processing of FIG. 39.
Figure 40B:
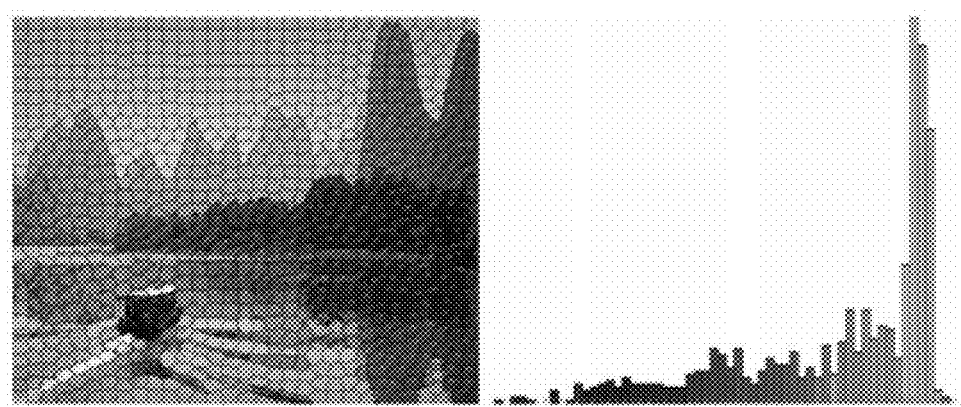
FIG. 40B illustrates another real example under the processing of FIG. 39.
Figure 41A:
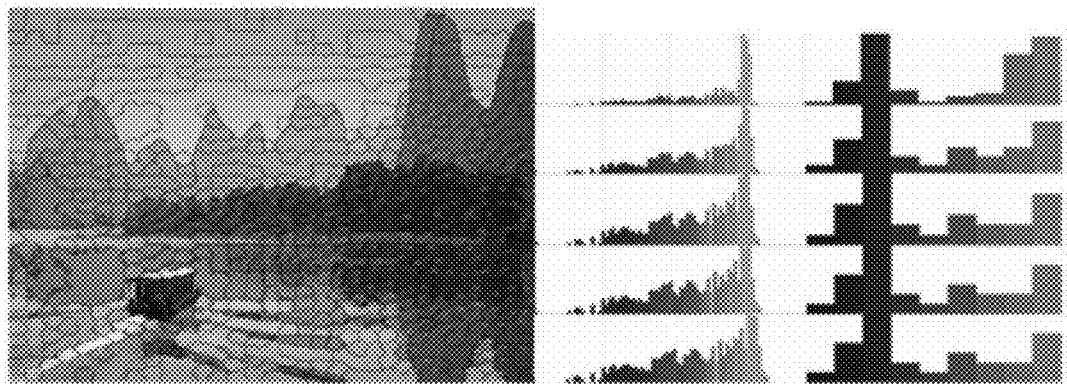
FIG. 41A illustrates processed result under multiple iterations of the processing of FIG. 39.
Figure 41B:
FIG. 41B illustrates a generated drawing based on the clustering result.
Figure 42:
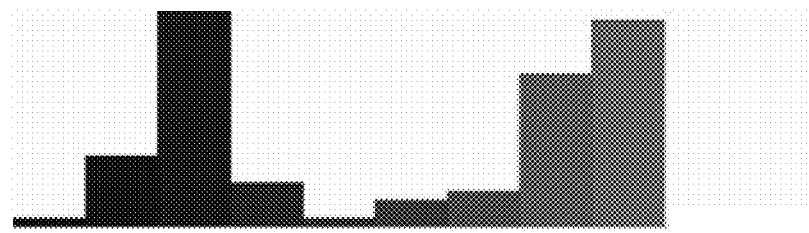
FIG. 42 illustrates a histogram for a group of pixel sets in a preferred embodiment.
Figure 45:
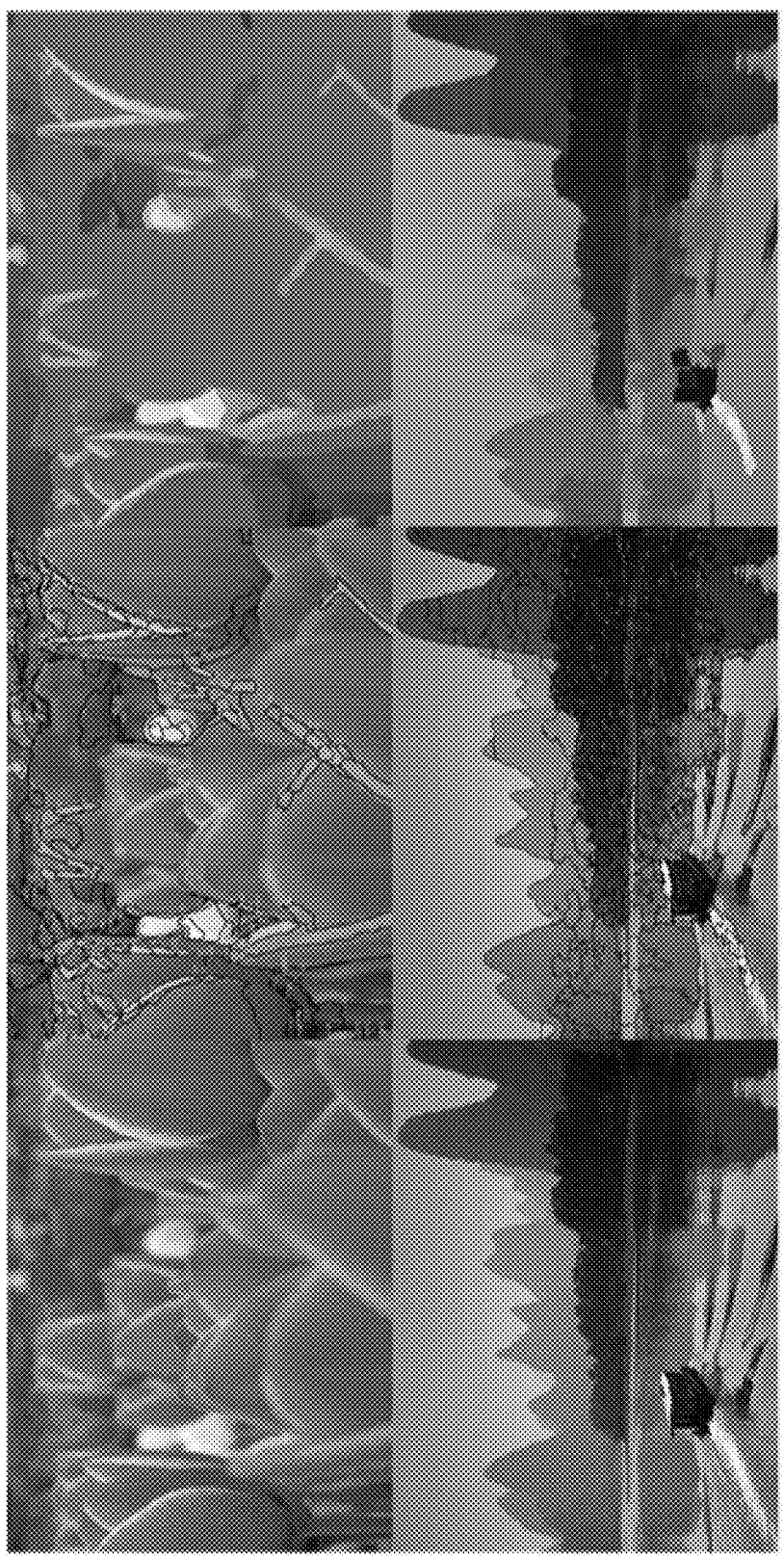
FIG. 45 illustrates comparison among experiments under the preferred embodiment.

FIG. 40A and FIG. 40B respectively illustrate two real examples of images and their histogram graphs under the processing flow of FIG. 39. FIG. 41A illustrates that multiple iterations are applied for pixel clustering. After such clustering is performed, a mean value for each super pixel may be calculated and generate a new image by filling the mean value in each super pixel. FIG. 41B shows a real example under the processing flow of FIG. 39. It is clearly noted that such drawing is mimic to a painting drawn by real human because the processing method is based on an insight of how human perceives the world. This brings a lot of potential for future development based on the finding of the present invention.

On the other hand, when pixels in an image are effectively grouped into meaningful pixel clusters, the relation of the pixel clusters may provide helpful information for determine the type of the image so that a more suitable processing may be chosen. For example, if the pixel clusters under the processing of FIG. 39 are mostly found as vertical objects while having little or no sky objects or ground objects in an image according to the processing as mentioned above, the image may be determined captured as a near viewpoint, instead of a general scene image captured in a gravity-like environment.

FIG. 42, FIGS. 43, 45 and 46 illustrates several experiments using the preferred embodiment to divide the super pixels further into larger pixel blocks. It is clear to see that under such techniques, the pixels are divided into accurate and meaningful groups. In addition to decrease complexity for continued processing, such grouping of pixels still keeps accurate information that is critical for following processing like machine vision, image processing or other applications.

Figure 46:
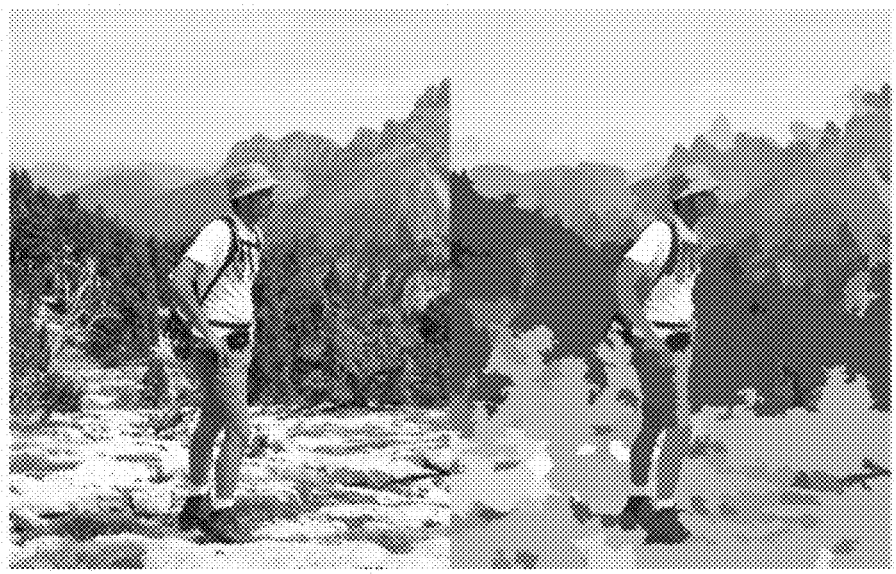
FIG. 46 illustrates an experiment using benchmark images.

For example, in FIG. 46, which is a benchmark image, it is clear to see that under the grouping, the person image is divided into portion of a face, a hat, arms, clothing, pants, shoes and scenes behind. With reference to inherent relation of these objects, it can be easily and efficient to recognize this image and extract a lot of useful information.

Please be noted that aforementioned methods like super pixel grouping, distribution function and others may be integrated in various methods for different design needs. Not every method needs to be used in a single application and other methods not mentioned above may be cooperated with the aforementioned methods to construct various applications.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A method for processing images in an electronic system, comprising:
   mapping multiple pixel sets of an image to a color space that includes a color sub-space and a luminance sub-space, the color sub-space substantially associating to visible light frequencies;
   classifying the multiple pixel sets into at least a first type of pixel sets and a second type of pixel sets according to a feature of the multiple pixels in the color-subspace;
   generating a first statistic distribution for the first type of pixel sets over corresponding visible light frequencies of the first type of pixel sets;
   generating a second statistic distribution for the second type of pixel sets over corresponding luminance values of the second type of pixel sets;
   joining the first type of pixel sets and the second type of pixels respectively to generate multiple pixel blocks; and
   performing a continued processing to the image using the multiple blocks.

2. The method of claim 1, wherein the color space is a CIELAB color space, where each pixel is represented as a (L, A, B) vector, the color-subspace is made of (A, B) vectors and the luminance sub-space is made of L component.

3. The method of claim 1, wherein the first statistic distribution is performed by analyzing average polar angles of pixels of the first type of pixel sets in the color sub-space and the second statistic distribution is performed by analyzing average norms of the second type of pixel sets in the luminance sub-space.

4. The method of claim 1, wherein in the step of classifying the multiple pixels sets comprises:
   classifying one pixel set into the first type of pixel sets if the pixel set has a norm larger than a predetermined threshold in the color sub-space; and
   classifying the pixel set into the second type of pixel sets if the pixel set has a norm smaller than the predetermined threshold in the color sub-space.

5. The method of claim 1, wherein the first statistic distribution and the second statistic distribution respectively correspond to visible light frequency values and luminance values that are respectively divided into multiple ranges, and the first type of pixel sets and the second type of pixel sets are counted into histograms of these multiple ranges to obtain the first statistic distribution and the second statistic distribution.

6. The method of claim 5, wherein peak values of the histograms of the first statistic distribution and the second statistic distribution are identified and used for joining the multiple pixel sets into the multiple pixel blocks further by reference to geographic positions of the multiple pixel sets.

7. The method of claim 6, wherein the multiple pixel blocks are regarded as new multiple pixel sets and taken as input for performing a new iteration of the first statistic distribution and the second statistic distribution to further joining the new multiple pixel sets.

8. The method of claim 1, wherein the first statistic distribution and the second statistic distribution are performed by multiple processing threads that are allocated to be executed by multiple processor hardware components in parallel.

9. The method of claim 1, wherein the continued processing comprises analyzing features of the multiple pixel blocks to categorize the multiple pixel blocks into different types of objects.

10. The method of claim 1, wherein the continued processing comprises machine vision and navigation operation.

11. The method of claim 1, further comprising classifying the pixels in the image into the multiple pixel sets by:
mapping the pixels into the color space;
using the polar angles of the pixels in the color sub-space to calculate color difference between two pixels; and
using the color difference among the pixels to generate the pixel sets.

12. The method of claim 11, further comprising calculating a normalized geographic distance between two pixels, wherein the normalized geographic distance the color difference are further combined as a combined difference between two pixels and the pixels are classified into the multiple pixel sets according to the combined differences of the pixels.

13. The method of claim 11, wherein the color difference between the two pixels is also calculated by reference to luminance values of the two pixels, and the weightings of the luminance values and the polar angles considered for generating the color difference are adjusted depending on the light source type for taking the image.

14. The method of claim 11, wherein the color difference between the two pixels is also calculated by reference to luminance values of the two pixels, and the weightings of the luminance values and the polar angles considered for generating the color difference are adjusted depending on purity values of the two pixels in the color sub-space.

15. The method of claim 14, wherein the purity values are the norms of the two pixels in the color sub-space.

16. An apparatus with machine vision, comprising:
a storage for storing an image to be processed; and
a processor for mapping multiple pixel sets of an image to a color space that includes a color sub-space and a luminance sub-space, the color sub-space substantially associating to visible light frequencies, classifying the multiple pixel sets into at least a first type of pixel sets and a second type of pixel sets according to features of the multiple pixels in the color-subspace, generating a first statistic distribution for the first type of pixel sets over corresponding visible light frequencies of the first type of pixel sets, generating a second statistic distribution for the second type of pixel sets over corresponding luminance values of the second type of pixel sets, joining the first type of pixel sets and the second type of pixels respectively to generate multiple pixel blocks, and performing a continued processing to the image using the multiple blocks.

17. The apparatus of claim 16, further comprising:
multiple processor circuits instructed by the processor for handling the first statistic distribution and the second statistic distribution in parallel.

* * * * *